Dec. 19, 1950  S. L. NEVINS ET AL  2,534,792
REACTION FURNACE AND RECOVERY UNITS
Filed Jan. 25, 1945  10 Sheets-Sheet 6
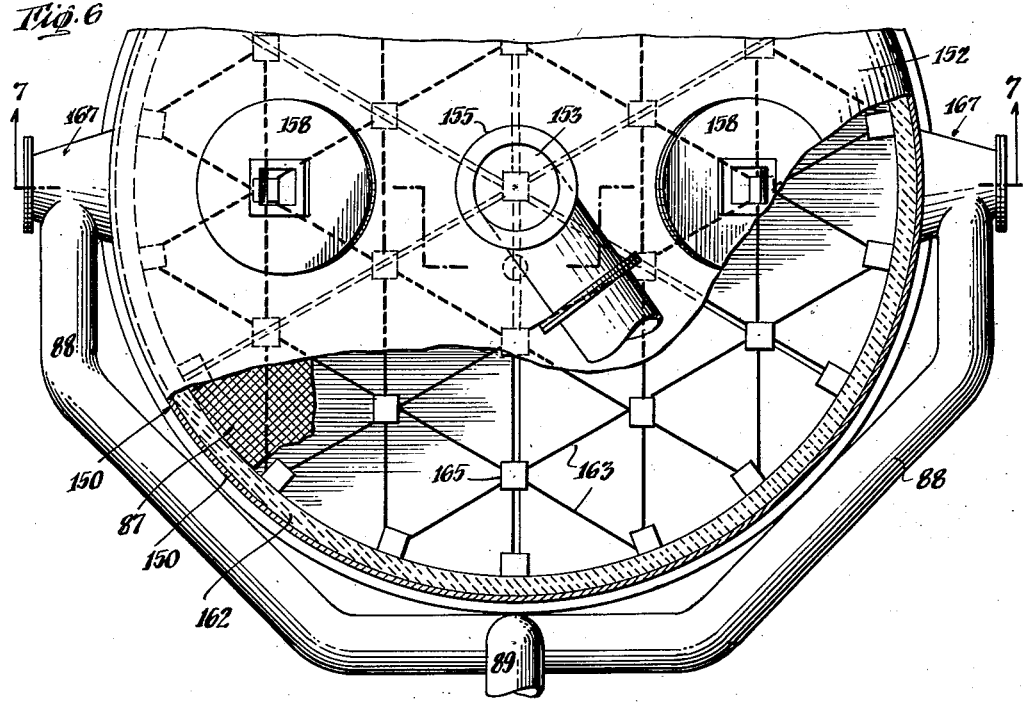
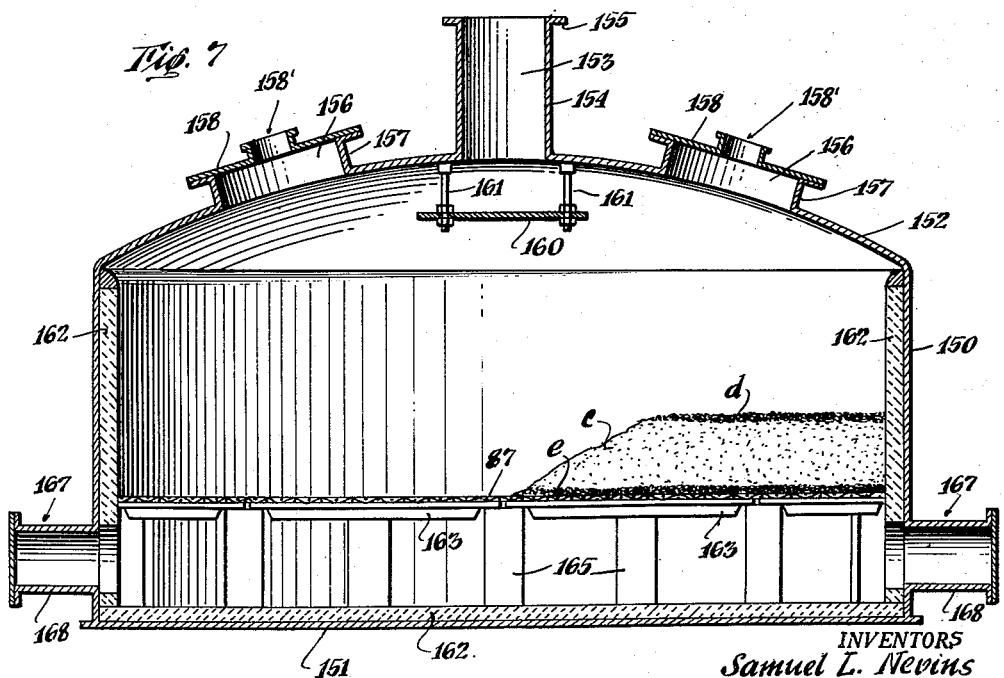
INVENTORS
Samuel L. Nevins
James S. Gilliam, Jr.
BY
Austin, Wilhelm & Carlson
ATTORNEYS

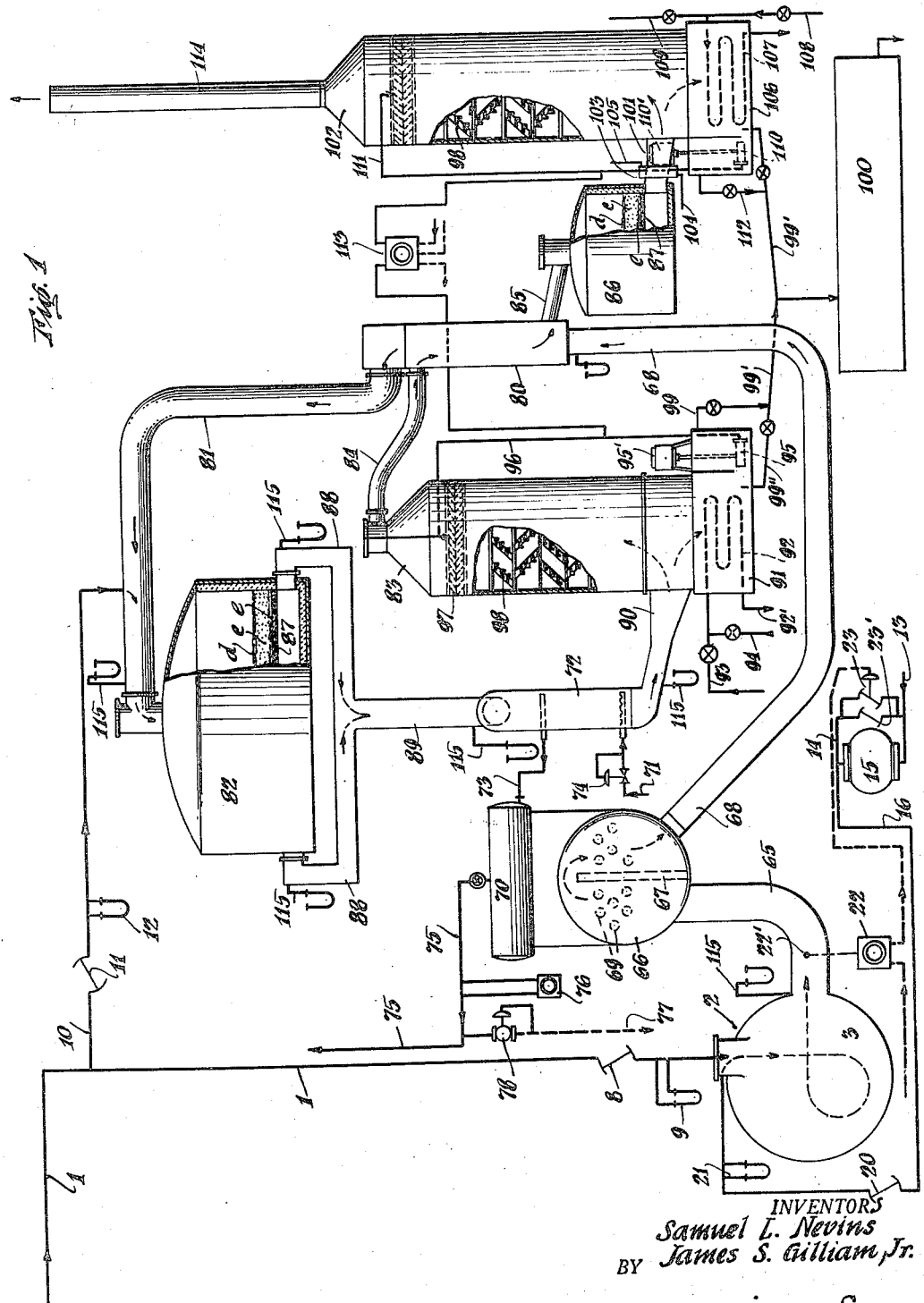

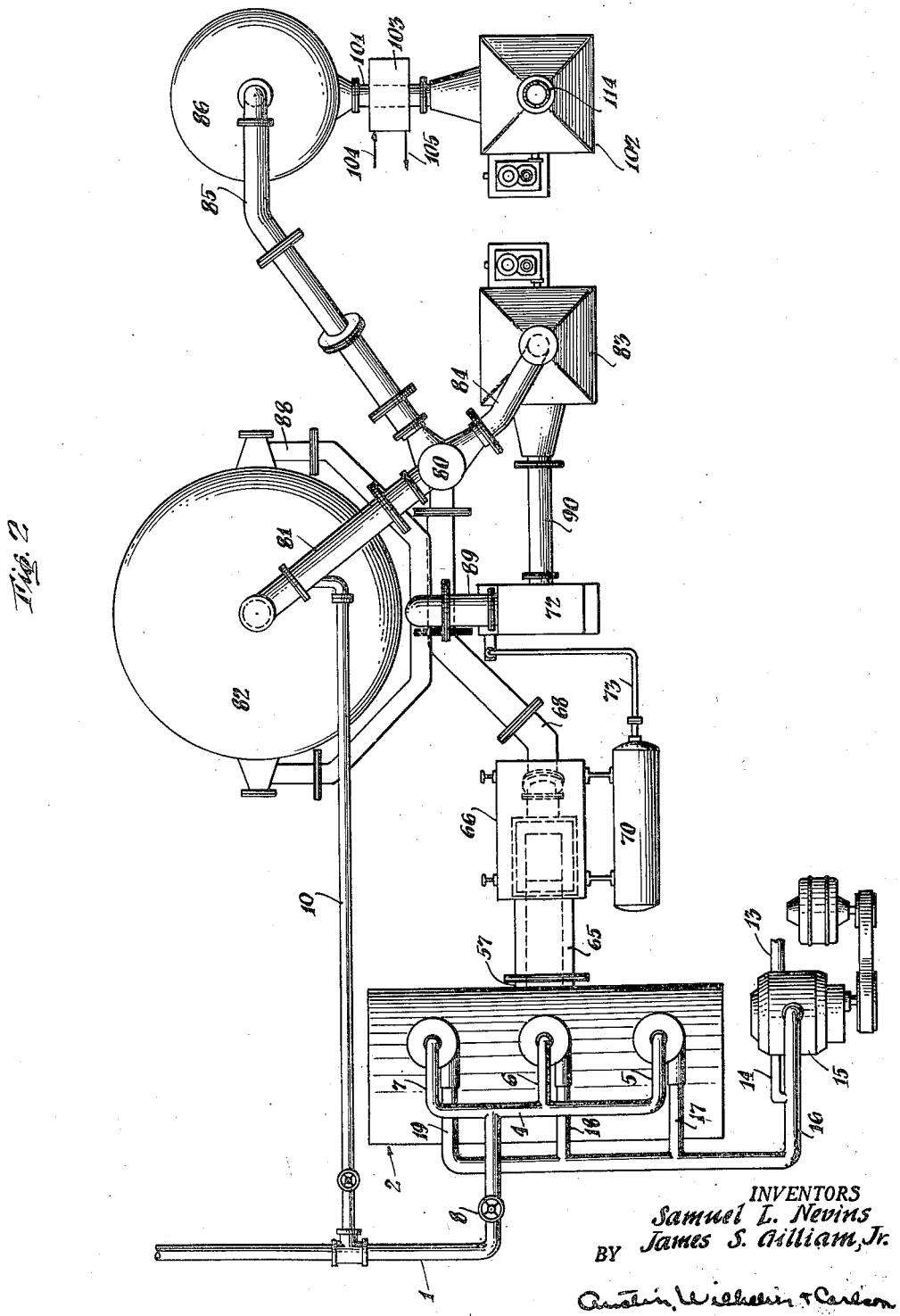

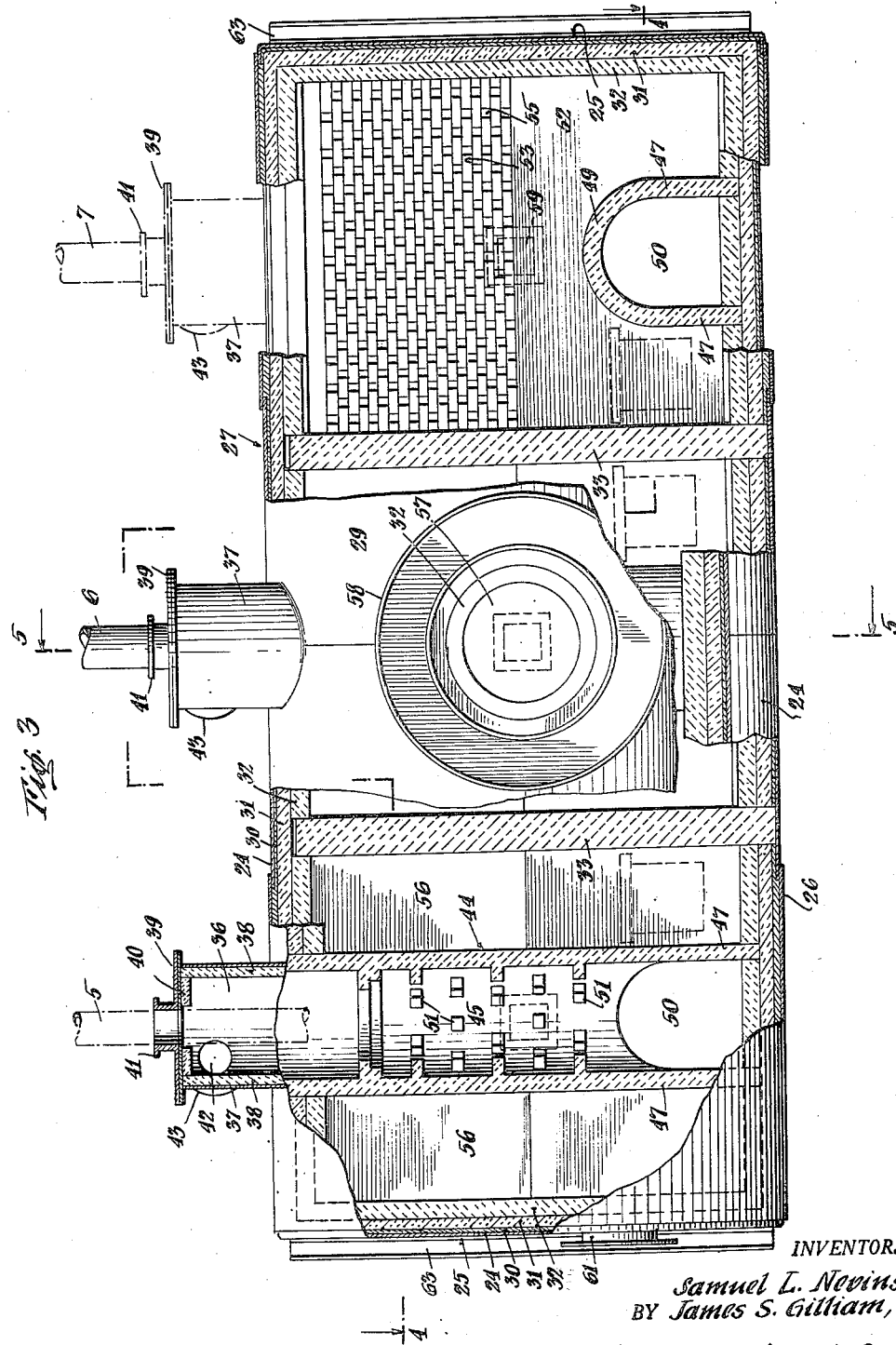

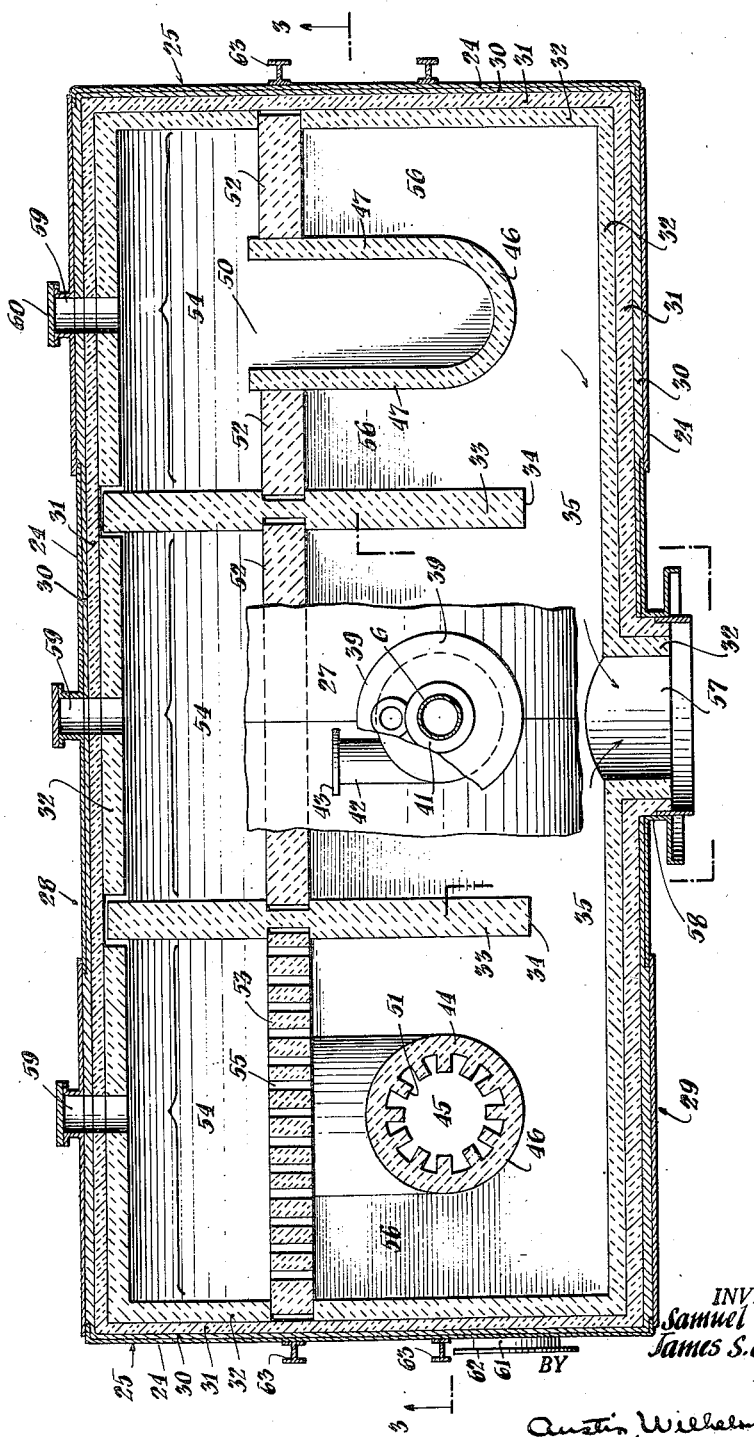

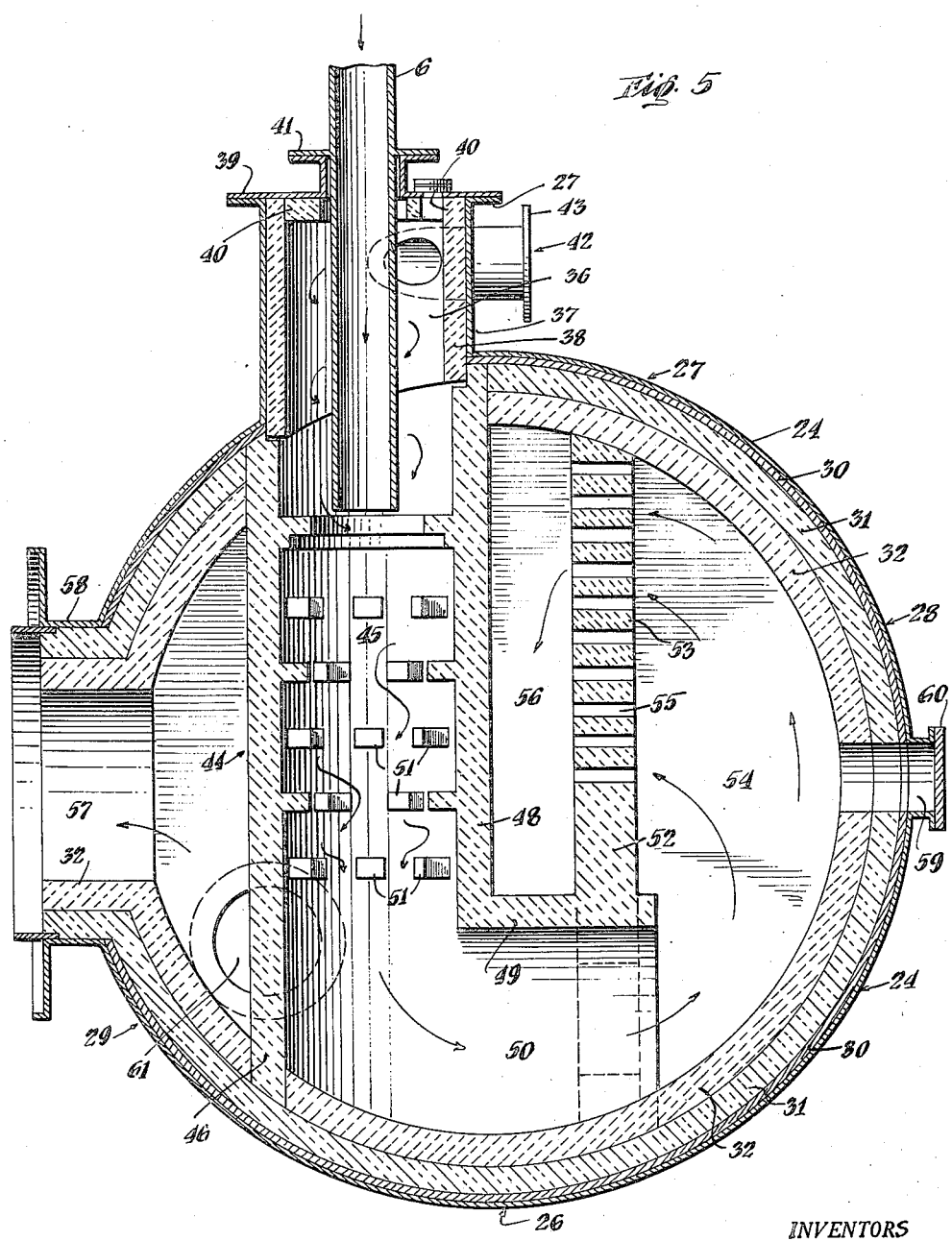

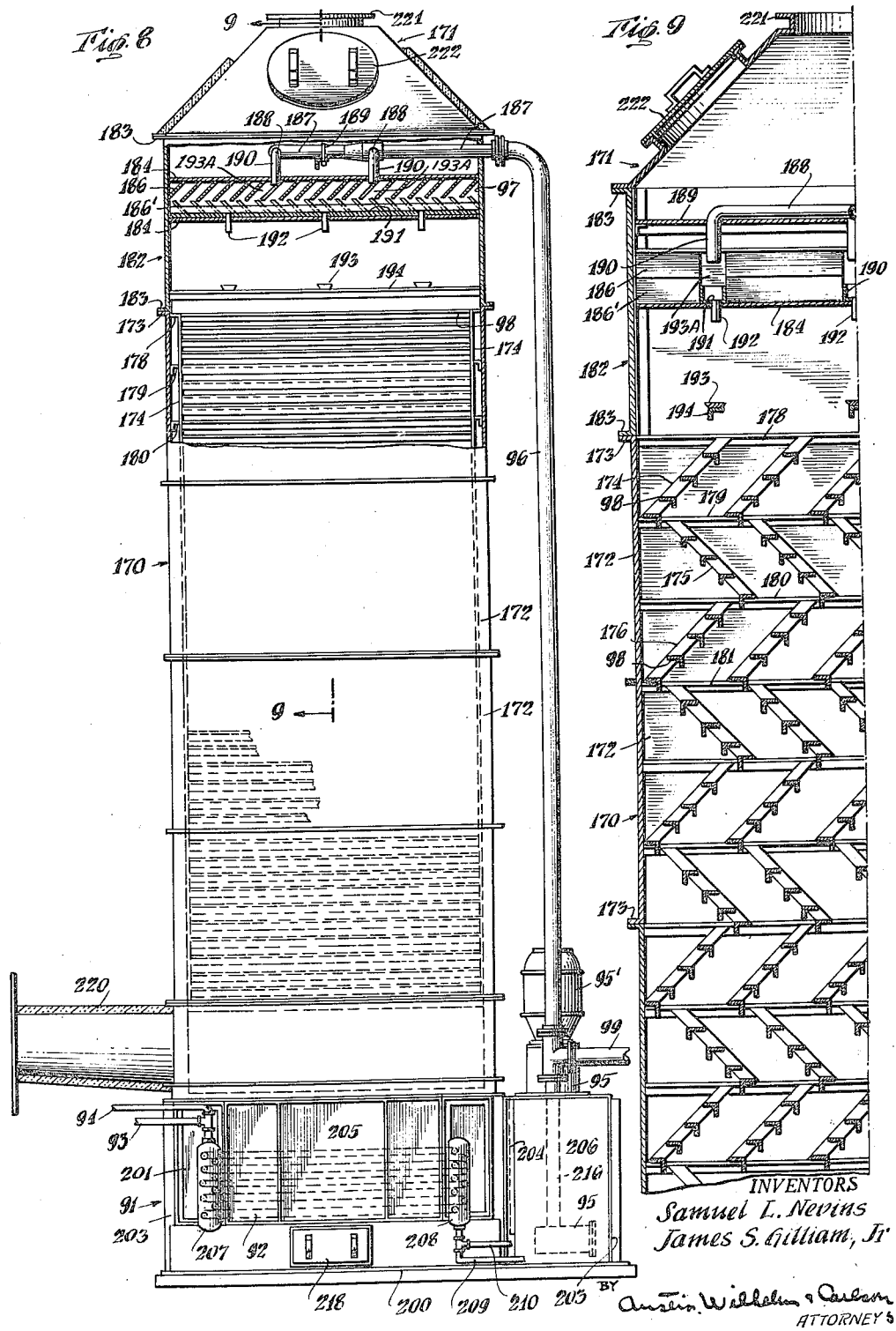

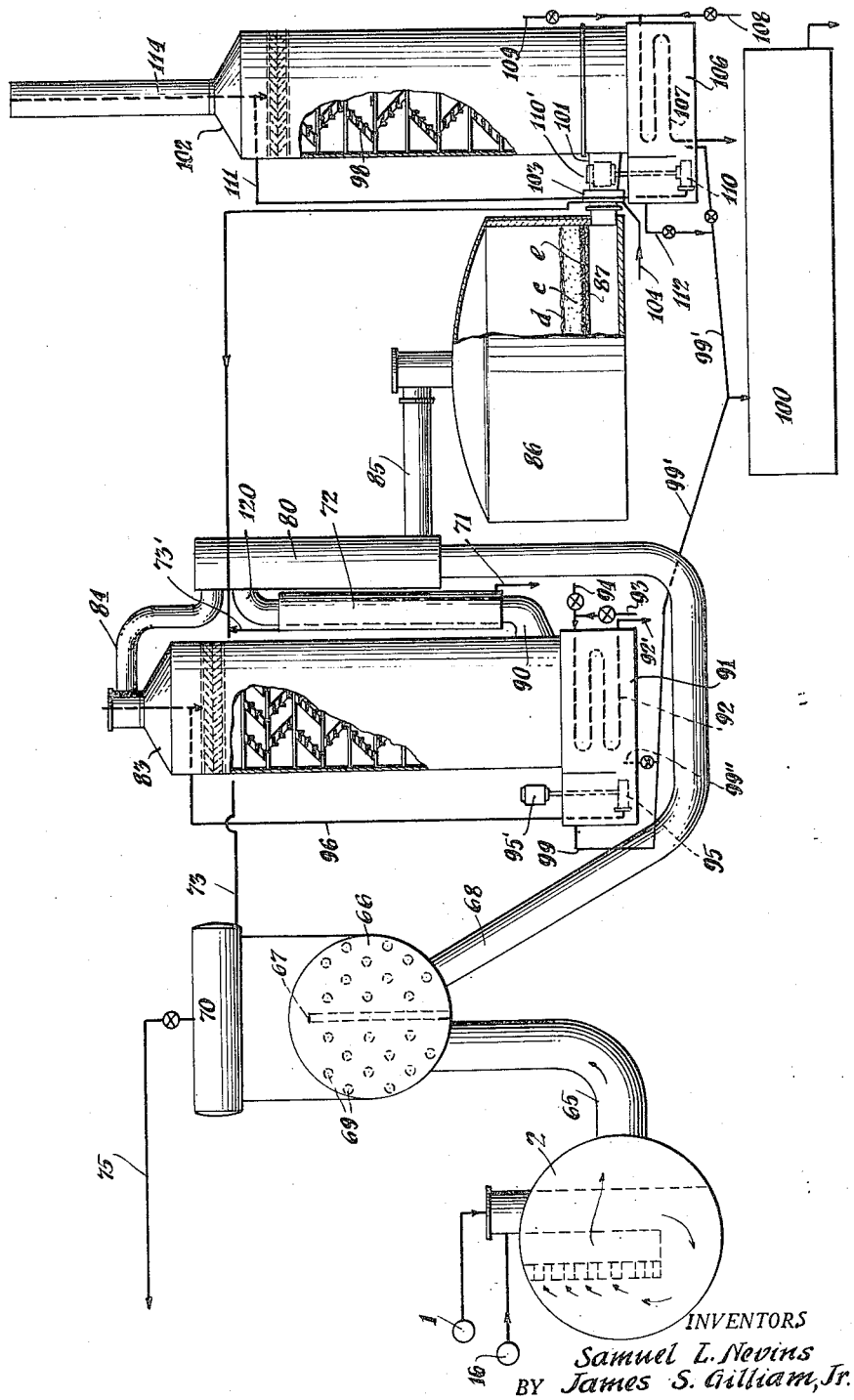

Dec. 19, 1950 S. L. NEVINS ET AL 2,534,792
REACTION FURNACE AND RECOVERY UNITS
Filed Jan. 25, 1945 10 Sheets-Sheet 9

Samuel L. Nevins
James S. Gilliam, Jr.
Inventors
Haynes and Koenig
Attorneys

Dec. 19, 1950     S. L. NEVINS ET AL     2,534,792
REACTION FURNACE AND RECOVERY UNITS
Filed Jan. 25, 1945     10 Sheets-Sheet 10

Samuel L. Nevins
James S. Gilliam, Jr.
Inventors
Haynes and Koenig
Attorneys

UNITED STATES PATENT OFFICE 2,534,792

REACTION FURNACE AND RECOVERY UNITS

Samuel L. Nevins, Little Rock, Ark., and James S. Gilliam, Jr., Shreveport, La., assignors, by mesne assignments, to Mathieson Chemical Corporation, New York, N. Y., a corporation of Virginia Application January 25, 1945, Serial No. 574,607

16 Claims. (Cl. 23—262)

This invention relates to a reaction furnace and to the recovery of elemental sulfur from acidic gases containing sulfur compounds, and is more particularly directed to a reaction furnace for effecting various conversions in vapor phase and to the treatment of hydrogen sulfide containing gases commonly thrown off as waste products in the refining of petroleum, natural gas, manufactured gas, and chemicals.

The waste acidic gases separated in the various extraction processes employed in the manufacture of commercial natural gas, coke oven gas, and petroleum products, normally contain sulfur in the form of hydrogen sulfide, and in addition thereto, usually contain water vapor and various gaseous materials in the form of carbon dioxide, carbon monoxide, and hydrogen, and in many instances sundry hydrocarbons such as methane, ethane, and propane. Again, in some waste acidic gases are found such sulfur compounds as, hydrogen sulfide, sulfur dioxide, carbonoxysulfide, carbon disulfide, and in certain instances, alkyl sulfides, together with gaseous paraffinic and olefinic hydrocarbons, water vapor carbon dioxide, and hydrogen.

Certain chemical treating plants may produce waste gases containing recoverable amounts of sulfur compounds, usually mixed or combined with impurities. For example, plants for the manufacture of carbon disulfide from sulfur and methane, may throw off waste gases containing sulfur vapor, hydrogen sulfide, methane, and other hydrocarbons.

Attempts have been made previously to recover commercially profitable yields of elemental sulfur from such waste acidic gases but without success, since the reactions which are reputed to occur in the treatment of hydrogen sulfide gases are not realized when working with relatively impure gases, which may be explained in part by reaction disturbances caused by other gaseous impurities and materials which the waste input gases contain. It has therefore been the common practice to burn such waste acidic gases under boilers or in flare towers since such waste acidic gases have an obnoxious odor and are lethal in character and hence cannot be discharged into the atmosphere.

This invention is directed to a novel and commercially practical apparatus for treating such variant types of waste acidic gases containing sulfur compounds which are in sufficient concentration to warrant commercial recovery, and a characterizing feature of this invention is its permissive latitude for treating numerous types of sulfur containing gases. When such waste acidic gases are processed in accordance with this invention, such waste acidic gases constitute a valuable source of material from which commercially profitable yields of elemental sulfur of high purity may be obtained in an economical manner by continuous operation, with the final effluent gas substantially devoid of sulfur compounds and in condition for discharge to the atmosphere.

Moreover, as an integral part of this invention, a reaction furnace is provided which is designed and constructed so as to effect homogeneous mixing of the gaseous or finely divided materials to be processed and to effect proper reaction of the components and discharge of the reactants in a brief interval of time under continuous flow and controlled temperature conditions. This improved furnace combines the functions of an effective mixing unit, recuperative reheater and a reactor. The furnace comprises an enclosure or shell which is lined with a suitable refractory or acid-resistant material, depending upon the materials to be treated. An elongated passageway extends into the furnace, one end of which communicates with a feed opening through which the materials to be reacted are fed, and the other end thereof communicates with a laterally extending passageway which leads to a reaction zone. One or more bridge walls divides the furnace into one or more reaction zones wherein the components undergoing reaction are conducted from the laterally extending passageway. Each bridge wall includes an open checkerwork section through which the reactants may pass and flow in contact with the exterior wall of the elongated passageway to preheat the entering gaseous components prior to discharge from the furnace. A furnace constructed in accordance with this invention insures thorough mixing of the entering gaseous and finely divided components while moving through the restricted passageway under conditions of turbulent flow, a thorough reaction of the mixture in the reaction zone, preheating of the entering materials by the reactants flowing in indirect heating relationship with the incoming gaseous components flowing through the restricted passageway, and a continuous discharge of the reactants from the furnace. Thus a continuous flow of the gaseous and solid materials are effected and during such flow are thoroughly mixed, preheated and reacted. The furnace is highly adapted for the conversion of various gases, vapors and finely divided materials to effect oxidation or combustion thereof, or to effect other physical or chemical reactions between the feed constituents.

As particular examples, a furnace constructed in accordance with this invention, is efficiently adapted for the treatment of hydrogen sulfide and other acidic gases to recover elemental sulfur and other gaseous end products, as described more particularly in our copending application Serial No. 574,606, filed January 25, 1945, now Patent No. 2,497,095. This improved furnace is also adapted for carrying out various pyrolytic conversions, as for example, the pyrolytic conversion of gaseous hydrocarbons to higher molecular weight hydrocarbons by incomplete combustion, where rapid elevation of temperature through a steep time gradient is desirable to prevent reconversions or decomposition of the desired end products.

An object of this invention is to provide an improved reaction furnace wherein gaseous and finely divided materials can be treated under continuous flow conditions and desired reactions effected in a relatively short interval of time.

Another object of this invention is to provide an improved reaction furnace adapted for the treatment of gaseous and finely divided components wherein mixing and preheating of the reactants is effected while out of contact with the products of reaction.

Another object of this invention is to provide an improved reaction furnace wherein gaseous and solid materials may be consecutively mixed, preheated and reacted under continuous flow conditions.

A further object of this invention is to provide an improved reaction furnace adapted for the treatment of acidic gases containing sulfur compounds to effect conversion thereof to sulfur vapor and other gaseous and vapor constituents.

A further object of this invention is to provide a furnace which combines in one unitary structure the essential functions of a mixing device, a recuperative heater and reaction unit, whereby gaseous components are intimately and homogeneously mixed, elevated through a steep temperature gradient in a brief period of time, and are caused to react under conditions insuring highly satisfactory and product yields.

An additional object of this invention is to provide an improved apparatus for the treatment of waste acidic gases containing sulfur compounds whereby elemental sulfur of high quality may be recovered in a highly economical and practical manner.

Another object of this invention is to provide an improved apparatus for the treatment of waste acidic gases containing sulfur compounds whereby the obnoxious and toxic constituents may be substantially completely removed therefrom, thereby providing a resulting effluent gas unharmful to animal and plant life.

Another object of this invention is to provide a highly economical and efficient apparatus for the recovery of elemental sulfur from gases cast off from refining, gas treating, and chemical operations.

Another object of this invention is to provide a novel apparatus for the production of elemental sulfur from waste acidic gases containing sulfur in the combined state, and whereby the operation can be carried out by the heat of reaction of the gaseous constituents and without the application of external heat, and whereby heat values are generated which can be advantageously converted into steam or other useful heat forms.

A further object of this invention is to provide an apparatus for the effective conversion of hydrogen sulfide to elemental sulfur by successive and continuous treatment in a reaction zone and in one or more catalytic conversion zones at a low cost and with a high yield of recovered elemental sulfur of high purity.

Other objects and advantages of this invention will be more readily understood and comprehended from the following disclosure.

For ready comprehension of the invention, the chemical and physiochemical factors involved in the operation, and the design and construction of the apparatus, there is shown in the accompanying drawings a series of embodiments of physical structure in which:

Fig. 1 is a diagrammatic side elevational view of the apparatus comprising a complete plant constructed in accordance with this invention;

Fig. 2 is a top plan view of the apparatus shown in Fig. 1;

Fig. 3 is an enlarged view of the reaction furnace wherein a part of the reaction takes place, this view being partly in elevation and partly in vertical cross-section to more clearly illustrate the construction and details of the furnace as the same appears when viewed along line 3—3 of Fig. 4;

Fig. 4 is another enlarged view of the reaction furnace shown partly in horizontal cross-section and partly in plan as the same appears when viewed along line 4—4 of Fig. 3;

Fig. 5 is an enlarged vertical cross-sectional view of the reaction furnace as the same appears when viewed along line 5—5 of Fig. 3;

Fig. 6 is an enlarged plan view of the catalytic converter forming a part of the apparatus, certain parts being broken away to illustrate certain structural details thereof;

Fig. 7 is a vertical cross-section of the catalytic converter as the same appears when viewed along line 7—7 of Fig. 6;

Fig. 8 illustrates the scrubbing tower unit shown partly in elevation and partly in vertical cross-section to more fully reveal the structural details thereof;

Fig. 9 is a fragmentary vertical cross-sectional view of the scrubbing tower as the same appears when viewed along line 9—9 of Fig. 8;

Fig. 10 is a diagrammatic elevational view of a highly effective but more simplified form of plant for the recovery of elemental sulfur from acidic gases containing sulfurous compounds;

Similar reference characters refer to similar parts throughout the several views of the drawings and specification.

Figure 11:
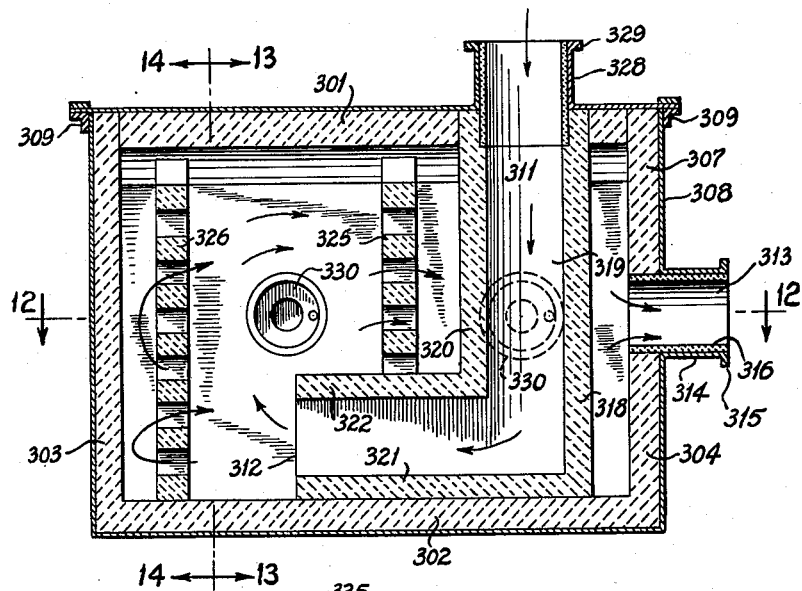
Fig. 11 is a vertical cross-sectional view of a reaction furnace of the present invention as the same appears when viewed along line 11—11 of Fig. 12.

In carrying out the processing operation, the input waste acidic gas is first analyzed to determine the approximate quantities of gaseous materials contained therein. As the initial step in the operation a stoichiometric amount of oxygen, as in the form of air, is added to the waste acidic gas to be treated. In determining this stoichiometric balance consideration is given to the quantity of oxygen necessary to convert the hydrogen sulfide content of the waste gas to elemental sulfur, the quantity of oxygen given up during the reaction by oxygen containing materials in the waste gas, and the oxygen required by other gaseous compounds and materials in the input waste acidic gas to effect oxidation thereof. By thus determining and controlling the stoichiometric amount of oxygen required in the various reactions which proceed in the system, an actual sulfur recovery of 90 per cent or more of the theoretical recovery can be obtained, even with waste acidic input gases containing as low as 15 to 20 per cent hydrogen sulfide.

It is possible by employing an excess of air to react all of the hydrogen sulfide in the charge, but in this circumstance, an excess amount of sulfur dioxide is formed which is unavailable for conversion to elemental sulfur unless additional hydrogen sulfide is fed into the system to effect reaction.

It is important to observe that the presence of carbon dioxide in the entering waste acidic gas does not require the addition of oxygen in the form of air beyond the stoichiometric amount and that the amount of air computed on the basis of hydrogen sulfide should still be maintained. It has been found, however, that the presence of carbon dioxide does complicate the conversion by reason of the intermediate reactions with the formation of carbon disulfide and carbonoxysulfide which must be converted in subsequent stages of the process to carbon dioxide and elemental sulfur. It has also been found that the presence of hydrocarbon compounds in the waste acidic gas does require sufficient additional air to establish substantial stoichiometric balance if maximum sulfur recovery is to be attained.

Important factors in establishing and maintaining the efficiency of the operation are careful quantitative control of the air fed to the reaction zone and the complete and homogenous mixing of the reactants to insure a substantially quantitative reaction.

The theoretical formula for determining the proper air and gas proportion is—two mol volumes of hydrogen sulfide in the waste acidic gas to one mol volume of oxygen in air. Assuming that a typical waste acidic gas to be processed will contain approximately 50 per cent of hydrogen sulfide, the theoretical quantity of waste acidic gas charged per unit of time is determined as follows:

$$2\frac{H2S}{.5} = \frac{379 \times 2}{.5} = 1516 \text{ cu. ft. waste acidic gas @ } 60°\text{ F. and } 14.73\text{\# Abs.}$$

The same quantitative amount of air (21% oxygen) required in the reaction per unit of time similarly is determined as follows:

$$\frac{O2}{.21} = \frac{379}{.21} = 1806 \text{ cu. ft. of air at } 60°\text{F. and } 14.73\text{\# Abs.}$$

In order to achieve stoichiometric balance, it is necessary to make a careful analysis of the input waste acidic gas. All of the reactive gases which contain sulfur introduced into the unit must be considered in computing the stoichiometric balance. Thus in addition to hydrogen sulfide, such gaseous compounds as sulfur dioxide, carbon disulfide, carbon oxysulfide, and sulfur trioxide, should be considered. Also in computing the stoichiometric balance, the hydrocarbons present in the entering waste acidic gas must be taken into account, and a sufficient amount of oxygen supplied therewith to form carbon dioxide and water vapor. If the hydrocarbon content of the entering waste acidic gas changes, the established air to gas ratio will be unbalanced and will necessitate a proportionate change in the quantity of air required to react with the hydrocarbons. A large quantity of hydrocarbons in the waste acidic gas should be avoided because of the greatly increased amount of air required and because of the tendency to deposit carbon in the system. If there is a deficiency of air because of the change in the hydrocarbon content of the waste acidic gas, it will increase the resistance of the unit to the gas flow, and contaminate the recovered sulfur with the carbon which may be thus formed, and give a lower yield of elemental sulfur because of the diluting gases. The process described herein is, however, designed for relatively wide latitudes in hydrocarbon content and can accommodate the hydrocarbons normally encountered in waste acidic gases without appreciable carbon deposits or stack losses. No additional oxygen in the form of air need be supplied because of the presence of carbon dioxide in the entering waste acidic gas. However, if there is carbon monoxide present, additional oxygen in the form of air must be supplied to convert the same to carbon dioxide for most efficient production and maximum recovery of the sulfur.

In a typical operation therefore, assuming the entering waste acidic gas contains 50 per cent of hydrogen sulfide, the proportion of the waste acidic gas to the air charged to the reaction zone will be 1516 cubic feet of waste acidic gas to 1806 cubic feet of air. If the waste acidic gas contains hydrocarbons or carbon monoxide, sufficient additional air should be added to effect complete oxidation thereof. When such quantitative amounts of reactants are supplied and are treated in accordance with the method to be described, extremely high yields of elemental sulfur are secured.

The apparatus of the present invention includes a reaction furnace, described in detail hereinafter, and associated control devices for mixing the sulfur containing waste acidic gases with substantially stoichiometrically established quantities of oxygen as in the form of air, as defined above, under such conditions of turbulent flow and temperature as to insure complete and homogeneous mixing and consequent high conversion of sulfur containing compounds to sulfur vapor.

In the preferred or optimum operation of this apparatus it is desirable to secure a substantially complete conversion of the waste acidic gas not only to recover the greatest amount of sulfur, but also to reduce the content of the hydrogen sulfide and sulfur dioxide in the effluent reaction gases so that such gases will not constitute a nuisance when discharged into the atmosphere. In such preferred operation, the reaction gases discharged from the reaction furnace are substantially reduced in temperature and moved into a converter containing catalytic material to insure oxidation of any remaining hydrogen sulfide and the reduction of the contained sulfur dioxide, carbon oxysulfide, and carbon disulfide, to sulfur vapor. By such catalytic treatment of the reaction gases discharged from the reactor, approximately 85 to 90 per cent of the sulfur gases in the waste acidic gas may be converted into elemental sulfur. The thus treated reaction gases are then preferably further reduced in temperature by means of suitable cooling equipment and treated in a scrubbing tower unit with a scrubbing agent, such as molten sulfur, to condense the sulfur vapors and recover the sulfur.

As a further refinement the scrubbed gases thus produced may be given a further pass through an additional catalyst bed contained within a second converter to convert remaining sulfur containing gases to sulfur vapor, which is removed by scrubbing treatment in a second scrubbing tower unit. By following this further step, it has been found that 95% of the available sulfur in the waste acidic gas may be removed and recovered as valuable elemental sulfur, and the effluent gas discharged from the final operation will have substantially no odor.

No external source of heat is employed after the process has been placed in operation. On the contrary, the heat of the reaction carried out as the initial step in the reaction furnace results in a reaction temperature of from approximately 1600° F. to 2400° F. which heat of reaction may be advantageously utilized by means of a boiler in the production of steam. The thermal economics in the operation are evident from the fact that the production of one long ton of sulfur will produce approximately 6,000 pounds of steam at 300 pounds pressure when waste gas containing approximately 50% hydrogen sulfide is processed according to our process.

It would appear that the oxidation of hydrogen sulfide in waste acidic gases to elemental sulfur would be a relatively simple operation, which presumably would proceed according to the equation—

(1) $2H_2S + O_2 \rightarrow S_2 + 2H_2O$

It has been ascertained, however, that the conversion is not such a simple matter because the impurities usually present add to the complexity of the reactions taking place, and the changes in equilibrium of the reactions which occur under different temperature conditions as the process proceeds. For example, when waste acid gas contains a substantial amount of carbon dioxide and hydrocarbons, it has been established that a whole series of reactions take place in the furnace as indicated by the following equations:

(2) $H_2S + \frac{1}{2}O_2 \rightarrow H_2O + \frac{1}{2}S_2$
(3) $H_2S + 1\frac{1}{2}O_2 \rightarrow H_2O + SO_2$
(4) $H_2S + CO_2 \rightarrow H_2O + COS$
(5) $2H_2S + CO_2 \rightarrow 2H_2O + CS_2$
(6) $H_2S + CO_2 \rightarrow H_2O + CO + \frac{1}{2}S_2$
(7) $H_2S \rightarrow H_2 + \frac{1}{2}S_2$
(8) $CH_4 + 2O_2 \rightarrow 2H_2O + CO_2$
(9) $C_2H_6 + 3\frac{1}{2}O_2 \rightarrow 3H_2O + 2CO_2$ It will be noted, from inspections of Equations 2, and 3, that both elemental sulfur and sulfur dioxide are formed in the reaction furnace. These two reactions proceed simultaneously, but at different reaction rates so that when the reactions are completed the reaction gases will contain both gaseous sulfur, sulfur dioxide, and unreacted hydrogen sulfide. If we assume that the waste acidic gases contain no carbon dioxide and that the stoichiometric amount of air is fed into the reaction furnace, the furnace effluent gases will contain elemental sulfur vapors, sulfur dioxide, and hydrogen sulfide, in stoichiometrically balanced amounts in the approximate equilibrium at that temperature. This equilibrium is not the same at different temperatures. When the furnace effluent gases are cooled as in the boiler, a new equilibrium is established at such lower temperature with the formation of additional sulfur vapor due to the reaction between some of the hydrogen sulfide and sulfur dioxide. In passing the reaction gases through the converter a substantial amount of hydrogen sulfide and sulfur dioxide react to form sulfur vapor.

If the waste acidic gases to be treated contain a substantial amount of carbon dioxide, the furnace effluent gases, stoichiometrically balanced, may contain but a trace of hydrogen sulfide although it would be expected that such furnace effluent gases should contain a small amount of hydrogen sulfide. The substantial absence of hydrogen sulfide in such effluent gases may be explained by the fact that the carbon dioxide content of the gas reacts with the hydrogen sulfide (see Equations 4, 5, and 6) to form substantial amounts of elemental sulfur and sulfur compounds which may be subsequently converted to elemental sulfur. It may thus be seen that the presence of substantial amounts of carbon dioxide in the entering waste acidic gases serves to effect substantially complete elimination of the hydrogen sulfide in the reaction furnace.

It is important to observe at this point that carbon dioxide content of the gas plays an important role in the desired conversion. It has been found (see Equations 4 and 5) that carbon dioxide reacts with hydrogen sulfide to form carbon oxysulfide and carbon disulfide, thus reducing the amount of elemental sulfur which is formed. This situation is aggravated when the reaction gases are cooled, as for example, in a boiler in a manner to be described. Under the lowered temperature conditions obtaining in the boiler the following series appear to take place:

(10) $2CO_2 + \frac{1}{2}S_2 \rightarrow 2CO + SO_2$
(11) $CO + \frac{1}{2}S_2 \rightarrow COS$
(12) $CS_2 + 3O_2 \rightarrow CO_2 + 2SO_2$
(13) $2H_2O + 1\frac{1}{2}S_2 \rightarrow 2H_2S + SO_2$ As will be seen subsequently, gases from the boiler are further reduced in temperature in the gas preheater. Under the new equilibrium conditions obtaining in the gas preheater, additional reactions take place, as is indicated by the following equations:

(14) $COS + H_2O \rightarrow CO_2 + H_2S$
(15) $2H_2O + 1\frac{1}{2}S_2 \rightarrow SO_2 + 2H_2S$ When the furnace effluent gases, after some cooling as in the boiler and preheater, are contacted with a suitable catalyst in the converter, further reactions occur according to the following equations:

(16) $2H_2S + SO_2 \rightarrow 2H_2O + 1\frac{1}{2}S_2$
(17) $2COS + SO_2 \rightarrow 2CO_2 + 1\frac{1}{2}S_2$
(18) $2CO + SO_2 \rightarrow 2CO_2 + \frac{1}{2}S_2$
(19) $CH_4 + 2SO_2 \rightarrow CO_2 + 2H_2O + S_2$
(20) $2H_2 + S_2 \rightarrow 2H_2S$ In accordance with this invention, the apparatus is adapted for flexible operation so as to recover sulfur from sulfur containing gases having commingled therewith various other non-sulfurous gases and materials, with resulting high sulfur recovery. By way of example, waste acidic gases have been treated in apparatus as herein described, containing as low as 15% hydrogen sulfide and up to 60% hydrogen sulfide, the remainder of the waste acidic gas being largely carbon dioxide, with a small amount of water vapor and hydrocarbon gases. When approximate stoichiometric balance was obtained by the addition of a controlled amount of air, supplied by a suitable control means, conversion in each instance proceeded smoothly and without interruption, with a recovery of 90% or more of free elemental sulfur.

There is shown in Figs. 11 to 14, inclusive, a simplified form of reaction furnace constructed in accordance with this invention and which may be defined as having enclosing surfaces including a top wall 301, a bottom wall 302, a rear end wall 303, a front end wall 304, and side walls 305 and 306. These walls are constructed of suitable heat-resistant and acid-resistant material 307, such as fire brick or silica carbide, cemented together to form an airtight enclosure. These refractory walls should be of sufficient thickness to prevent heat loss and withstand operating pressures and are preferably covered or incased by steel plates 308 of suitable gage, strengthened and reenforced as by a suitable steel reenforcing frame work 309. The interior surfaces of the refractory enclosing walls should be compounded, coated, or treated to withstand heat and resist destructive attack from the reactions and conversions to be carried on within the furnace. The inner surface of the refractory top wall 301 may be given an arcuate shape to reflect heat downwardly into the furnace.

Figure 12:
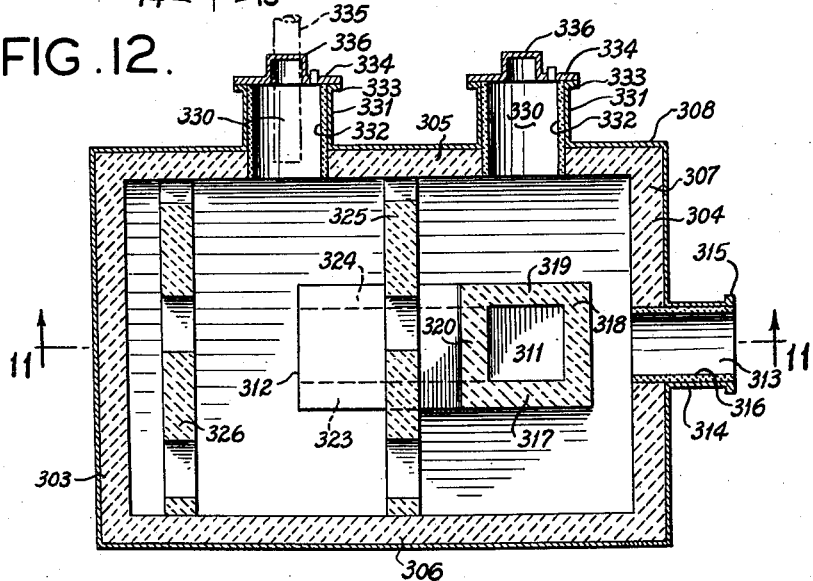
Fig. 12 is a horizontal cross-sectional view of the reaction furnace as the same appears when viewed along line 12—12 of Fig. 11.
Figure 13:
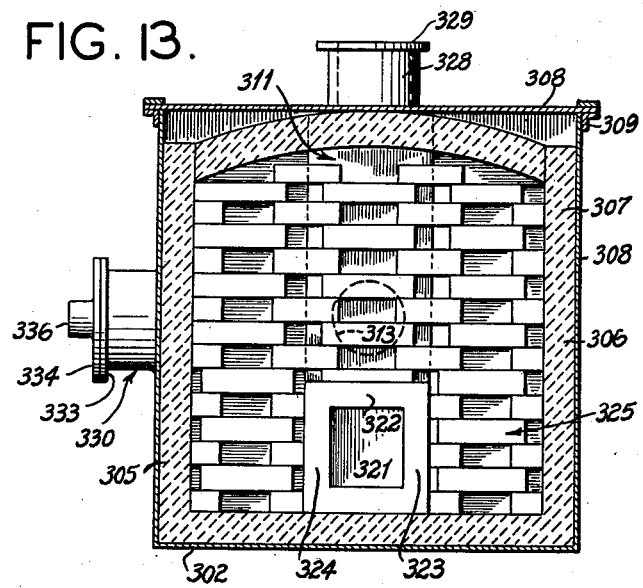
Fig. 13 is a vertical cross-sectional view through the reaction furnace as the same appears when looking in the direction of the arrows 13—13 as shown on Fig. 11.
Figure 14:
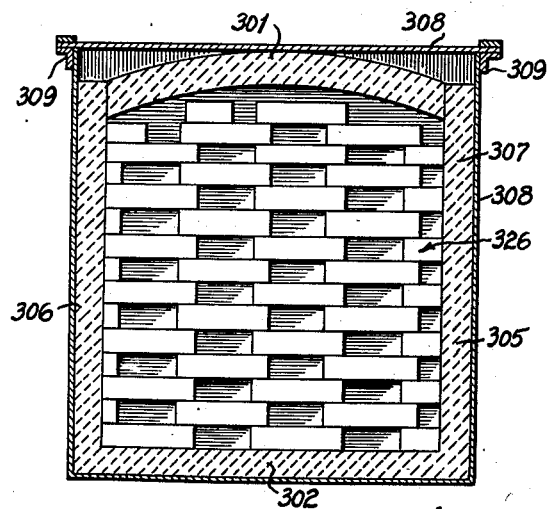
Fig. 14 is a vertical cross-sectional view of the reaction furnace as the same appears when viewed in the direction of the arrows 14—14 as shown on Fig. 11.

As shown more particularly in Figs. 11 and 12, the furnace is provided with a preheating passageway, duct or conduit 311 comprising a vertical section which extends downwardly into the furnace closely adjacent to the front wall 304 thereof, and a lateral section extending along the bottom wall 302 of the furnace towards the rear wall 303 and is in open communication with the interior of the furnace only at its discharge end 312. As shown in Fig. 12, the passageway 311 is positioned approximately midway between the side walls 305 and 306. The conduit or passageway 311 is constructed of fire brick, silica carbide or other heat- and acid-resistant material, and may be of any desired cross-sectional shape, and for convenience is shown in Figs. 11 and 12 as having a rectangular cross section. The vertical section of the passageway 311 is defined by vertical walls 317, 318, 319 and 320 which are joined to one end of the lateral section formed by bottom wall 321, top wall 322 and side walls 323 and 324. The top wall 322 of the lateral section is joined to the lower end of the vertical wall 320 of the vertical section, the bottom wall 321 of the lateral section extends to and is joined to the vertical wall 318 of the vertical section, and the side walls 323 and 324 of the lateral section extend and are joined to the vertical walls 317 and 319 of the vertical section, thereby providing a continuous passage for the gases through the vertical section and the lateral section.

The furnace is provided with an opening in the top wall 301 thereof into which the upper end of the vertical section of the passageway 311 projects. The upper end of the passageway 311 is provided with a metal collar 328 which is welded or otherwise secured to the steel plate covering the top wall. The collar 328 is lined with heat- and acid-resistant material and is provided with a flared flange 329 to which the gas feed lines may be connected.

One or more regenerative checker work bridge walls are positioned within the furnace which extends between the side walls 305 and 306 thereof. For purposes of illustration, the furnace shown in Figs. 11 to 14, inclusive, is provided with two such regenerative checker work bridge walls 325 and 326, spaced to effect most efficient reaction between the gaseous components. As shown in Figs. 11 and 12, checker work bridge wall 325 is positioned approximately centrally of the furnace and extends from the top wall 301 of the furnace down to and around the horizontal section of the passageway 311 to the bottom wall 302 and between the side walls 305 and 306. The checker work wall 326 is shown as positioned near the rear end wall 303 of the furnace and extends from the top wall 301 of the furnace down to the bottom wall 302 thereof and between the side walls 305 and 306 thereof.

The front wall 304 of the furnace is provided with an opening 313 through which the gaseous products of reaction are discharged. This opening is provided with a metal discharge collar 314 welded or otherwise secured to the steel plate covering the front wall 304. The collar 314 is provided with an appropriate flange or fitting 315 to which a discharge conduit may be connected. The interior of the collar 314 is lined with a suitable heat- and acid-resistant material 316.

In event an external source of heat or reaction material is required to supplement or effect the reactions to be carried out in the furnace, or in event the interior of the furnace must first be heated up to a predetermined temperature before reactions may be carried out, means have been provided for supplying such external heat or material to the furnace interior. As shown more particularly in Figs. 11, 12 and 13, a pair of ports 330 are provided which extend through the side wall 305 of the furnace. These ports are each formed by a steel collar 331 welded to the steel shell of the furnace and are lined with a suitable refractory lining 332. Each of the collars 331 are provided with a flange fitting 333 to which may be attached a fitting 334 for supporting an injector device 335, such as a burner tube or nozzle. If burners are used, they may be gas or oil fired. If the reaction to be carried out in the furnace requires only temporary treatment or heating, the burner tubes 335 may be withdrawn when the desired temperature has been obtained and the ports 330 sealed off by the attachment of a closure 336 to the fitting 334. It will be appreciated that the ports 330 provide an additional auxiliary to permit proper or flexible operation of the furnace and may be incorporated therewith, or not incorporated therewith, as the particular reaction to be carried out in the furnace requires. It will be further appreciated that the ports 330 may be used to supply additional reactants or materials to the furnace, cooling or heating media, or catalytic material in accordance with the requirements of the particular reaction to be carried out.

In operation the gases, vapors or finely divided materials to be treated and reacted are discharged in proper metered amounts from their respective conduits into the upper end of passageway 311. The charged materials may be admitted into the upper end of passageway 311 in angular streams so as to initiate a turbulent flow. The input gases move downwardly through the vertical passageway 311 and laterally through the lateral section of the passageway to be discharged from the end 312 thereof into the reaction zone of the furnace. The restricted passageway 311 is so constructed that the input gases flowing downwardly and laterally therethrough are subjected to a high degree of turbulence and mixing and are also heated by contact with the highly heated walls of the passageway. The passageway may be provided with projecting refractory bricks in the interior thereof to increase the surface contact area and to further effect turbulence of the gaseous mixture passing through the passageway. The gaseous mixture discharged from the end 312 to the passageway 311 is deflected by the rear wall 303 of the furnace and the gaseous reactants then moved forwardly through the highly heated checker work bridge walls 326 and 325 and around the passageway 311 and are finally discharged through the discharge port 313. The hot reaction gases moving forwardly through the space which surrounds the passageway 311 preheat the walls of the passageway and thereby quickly and indirectly heat the input gases moving through the passageway and into the reaction zone.

In event it is necessary to bring the interior of the furnace up to a predetermined temperature to initiate the reactions within the furnace, suitable heating units or burners may be temporarily inserted into the preheating ports 330. When the interior of the furnace has been brought up to the proper reaction temperature, the ports 330 may then be blanked off by applying the closure covers 336. It will also be appreciated that the ports 330 may be used to inject coolants, various reactants and catalytic materials into the furnace reaction zones as may be required by the particular reaction operation to be performed.

Where the furnace is to be used for the treatment of hydrogen sulfide-containing gases and the recovery of elemental sulfur therefrom, the interior of the furnace is brought up to a temperature of approximately 1000° F. before the hydrogen sulfide-containing gases and air, in proper metered amounts, are fed into the restricted passageway 311. As more fully explained in our copending application above referred to, the reaction between the hydrogen sulfide-containing gas and air, once the interior of the furnace has been heated to reaction temperature, continues without the supply of additional external heat. The autogenous heat generated by the reaction between these materials will maintain the interior of the furnace in highly heated condition and the products of reaction will be discharged from the port 313 at a temperature varying from approximately 1400° F. to 2400° F., depending upon the hydrogen sulfide content of the gaseous mixture. It will be appreciated, however, that the furnace above described is adapted for the processing of various gases, vapors and finely divided materials where a thorough mixing and preheating of the components is required, followed by oxidation, combustion or reaction of the components after the entering mixture has been brought up to proper reaction temperature by the indirect heating effect of the reactants.

There is shown in Figs. 1 and 2 of the drawings, a commercial plant which may be designed to any desired size to treat a relatively small amount or to treat many millions of cubic feet of waste acid gas per day. The waste acid gas, fed to the system through the waste acid gas supply line 1, may be derived from any source, such as one or more sour gas cleaning units, or from any other source of waste acid gas containing hydrogen sulfide. The waste acid gas supply line 1 conducts the waste acid gas to the intake side of the reaction furnace 2, which as shown in Figs. 3, 4, and 5, may contain one or more reaction zones 3. To supply each reaction zone, the supply line 1 leads to a manifold 4 having branch lines 5, 6, and 7, which lead to the respective reaction zones 3. The waste acid gas line 1, as shown in Fig. 1, has interposed therein the control valve 8 and the indicating flow meter 9. The waste acid gas line 1 may also be connected with branch line 10 having interposed control valve 11 and flow meter 12, through which a portion of the waste acid gas may be supplied to the system at a secondary reaction zone for a purpose and in a manner more particularly to be described.

The air required for the operation is admitted through line 13 and forced by blower 15 through line 16 and branch lines 17, 18, and 19, to the reaction zones 3 positioned within the furnace 2. The line 16 is provided with a block valve 20 and flow meter 21. The blower 15 is of sufficient capacity to insure the sufficient quantity of air required for the reaction and to force the gaseous products of reaction through the system.

As has been explained heretofore, a salient feature of the present apparatus is the maintenance of the proper proportions of air to waste acid gas in the reaction mixture. These proportions are directly related to the temperature of the reaction furnace effluent gases. Initially the waste acid gas to be treated is analyzed for hydrogen sulfide content and during operation the effluent gases at the discharge of the process are currently analyzed for hydrogen sulfide and sulfur dioxide. The air supply fed to the reaction furnace 2 through the air supply line 16 is carefully controlled by providing the outlet of the blower 15 with a by-pass line 14 which leads into the air supply line 13. The volume of air forced through the air supply line 16 is controlled by a pyrometer-recorder-controller 22 that is connected to a thermocouple 22' established in the furnace exit gas duct 65. A motor valve 23 connected into the air by-pass line 14 is controlled by the pyrometer-recorder-controller 22 in accordance with the variations in temperature of the furnace exit gases as indicated by the thermocouple 22'. A hand operated valve 23' may also be installed in the by-pass line 14 for manual regulation of the air volume passing through air supply line 16. It will be appreciated that a flow-ratio-controller could also be used to control the volume of air through line 16 in accordance with the variations of the volume of waste acid gas flowing to the system through waste acid gas supply line 1. By thus properly controlling the air and waste acid gas feed, losses by way of hydrogen sulfide can be reduced to 1% of the effluent gases discharged to the atmosphere, equivalent to an over all sulfur conversion of from 95% to 98% during continuous operation.

The furnace 2 and the reaction zones 3 therein are designed so that concurrent streams of entering waste acid gas and air are contacted and homogeneously mixed in passageways or conduits which latter are heated by the high temperature products of reaction. As will be seen, the flow of gases through the reaction zones is essentially regenerative, thus establishing a turbulence which positively insures mixing of the gases and uniform distribution of heat through the gas mixture.

The furnace would normally be designed to withstand pressures of about 5 pounds per square inch. It is found in actual practice that the internal furnace pressures do not materially exceed 2½ pounds per square inch. Such furnace pressures, as will be appreciated, are established and controlled by the back pressure developed through the unit. The back pressures vary, particularly if the system becomes fouled or partially corroded resulting in an increased resistance to gas flow. Therefore, the furnace should be designed with a sufficient factor of safety to take the maximum possible back pressure into account.

There is shown in Figs. 3, 4 and 5 a reaction furnace of somewhat modified form and has combined into one unit a plurality of reaction zones which can simultaneously operate at high efficiency to produce highly satisfactory results. This reaction furnace comprises an enclosed container having an external shell 24 built up of heavy steel plate. The furnace may either be generally circular or polygonal in cross-section with enclosing end walls 25 which close the ends of the body wall. The furnace as shown in Figs. 3, 4, and 5, is illustrated as having a body wall of generally circular cross-section and for convenience of description, the body wall will be designated as comprising a bottom wall section 26, a top wall section 27, a rear wall section 28, and a front wall section 29, enclosed between the end wall sections 25. The interior of the furnace is lined with suitable refractory and heat insulating material which may consist of a layer 30 of suitable plastic insulating material, a layer 31 of light weight insulating firebrick, and an inner layer 32 of firebrick.

The furnace may be of any desired length and diameter depending upon the production capacity desired. By way of example, such a furnace may have an internal diameter of approximately 8 feet and an internal length of approximately 24 feet. The furnace is divided into reaction compartments which define the reaction zones 3 by a plurality of dividing partitions 33, as shown more particularly in Figs. 3 and 4, which present solid walls built up from suitable firebrick. The dividing partitions or walls 33 extend from the bottom wall section 26 of the furnace to the top wall section 27 thereof and also to the rear wall section 28 of the furnace.

It will be noted by referring to Fig. 4 that the front edge 34 of each dividing wall 33 extends short of the front wall section 29 of the furnace to define a passageway 35 which communicates with the adjacent reaction zone 3. Thus it will be noted that the division walls 33 extend across approximately four-fifths of the internal cross-section of the furnace.

Leading into each chimney 44 is an entrance passageway 36 which is defined by a collar 37 built up of steel plate which is welded or otherwise secured to the top wall section 27 of the furnace 2. The steel collar 37 is suitably lined with refractory brick 38. The top of each entrance passageway 36 is closed with a steel plate 39 whose inner surface is also lined with refractory material 40. Each of the waste acid gas feed conduits 5, 6, and 7, extends through the entrance passageways 36 and projects a short distance into the passageway 45, as shown more particularly in Fig. 5. A sealing collar 41 surrounds each of the acid gas entrance conduits and provides an airtight seal for the closure plate 39 through which the acid gas conduit extends. It will be noted by referring more particularly to Fig. 5 that each of the entrance passageways 36 are offset to one side of the vertical plane bisecting the longitudinal center line of the furnace. Air entrance ports 42 as shown more particularly in Figs. 3, 4, and 5, lead tangentially into the entrance passageways 36 so that the entering air will swirl circumferentially around the waste acid gas entrance conduits and within the entrance passageways 36. Each of the air entrance ports 42 may be provided with a flange fitting 43 for convenient connection to the branch air lines 17, 18, and 19, respectively.

The reaction zones 3, defined by end walls 25 and the division walls 33, combine the essential functions of mixing chambers, recuperative chambers, and reaction chambers. As will be noted by referring to Figs. 3, 4, and 5, a restricted passageway or chimney 44 extends vertically downward from each of the entrance passageways 36. Each of the chimneys 44 is built up of heat resistant brick and has an internal diameter approximately the same as the internal diameter of entrance passageway 36, and define therein a waste acid gas and air mixing passageway 45 of restricted cross-section. The front portion 46 and side portions 47 of each chimney 44 extend down to and rest upon the interior bottom wall section 26 of the furnace, while the rear wall section 48 of the chimney extends downwardly into the furnace a distance from two-thirds to three-quarters from the top wall section 27 of the furnace. The rear wall section 48 of each chimney rests upon a horizontally extending wall 49 of firebrick. The lower side wall sections 47 of each chimney 44 are extended towards the rear wall section 28 of the furnace and are joined to the horizontal wall 49 so as to provide a horizontally extending passageway 50 leading from the chimney passageway 45 towards the rear wall 28 of the furnace. Each of the chimneys 44 is provided with inwardly jutting firebricks 51 which serve to give the air and waste acid gas mixture moving down through the chimney passageways 45 additional turbulence, thereby to insure thorough mixing and heating thereof.

A reaction compartment wall 52 extends longitudinally through each reaction compartment and presents a solid wall of firebrick which extends from the bottom wall section 26 of the furnace to a plane extending approximately horizontally through the longitudinal center line of the furnace. The compartment walls 52 surround but do not close off the horizontal passageways 50 and extend between the end wall sections 25 of the furnace and the division walls 33 thereof. A checkerwork bridge wall 53 rests upon the solid compartment wall 52 and extends to the top wall section 27 of the furnace. Each of the compartment walls 52 and associated bridge walls 53 divides the furnace interior reaction zones 3 into a rear reaction zone or compartment 54, into which the air and waste acid gas mixture is conducted from the horizontal passageways 50, and a front reaction zone 56. Each compartment 54 has a cross-sectional area which is approximately one-third to one-fourth of the entire cross-sectional area of the furnace. The bridge wall 53, highly heated by the reaction going on in the furnace, defines escape passageways 55 for the reaction gases which escape through these highly heated restricted passageways into the open spaces 56 surrounding each chimney 44 where these gases swirl around the chimney 44 and preheat the air and waste acid gas undergoing mixing in the chimney passageway 45. The reaction gases leaving the spaces 56 comingle in their flow through the passageways 35 and escape from the furnace through a discharge port 57 at the approximate center of the front wall section 29 of the furnace. The discharge port 57 may be formed by a steel collar 58 which is welded or riveted to the steel plates forming the front wall section of the furnace, the port 57 being suitably lined with firebrick 32.

There are provided preheating ports 59 which extend through the rear wall section 20 of the reaction furnace and lead centrally into each of the rear reaction chamber compartments 54. Suitably fired burners may be projected into each of the ports 59 to heat the reaction furnace reaction zones 3 to the desired temperature at the start of operations. When compartments or reaction zones 3 and the equipment has been heated to the desired temperature for starting operations the burners may be withdrawn and the ports 59 may be closed off by means of a suitable closure plate 60. The furnace may also be provided with conveniently arranged access ports 61 which are normally sealed off by suitable closure plates 62. The furnace may be strengthened by a stiffening framework 63.

The gas, vapors, or gas-suspended-finely-divided-materials to be treated, for example hydrogen-sulfide containing gas, enter the respective chimney passageways 44 of the furnace through the several gas lines 5, 6 and 7 and entrance passageways 36 in proper metered amounts. Simultaneously, other reactant gaseous materials, such as air, in accurately metered amounts are forced through the entrance passageway 36 from the port 42. The reactant gas enters the entrance passageway 36 in a tangential direction, and moves downwardly with a helical or swirling motion into the chimney passageway 44. Upon impinging the concurrently flowing streams of gas entering conduits 5, 6 and 7, turbulent helical flow is maintained, effecting intimate and homogeneous mixing of the gases. The mixed gases passing downwardly through the chimney passageway 44 are preheated by radiant heat and direct contact with the highly heated chimney walls. As described, the projecting bricks 51 not only increase the heating effect, but insure additional turbulence in the mixture and consequent improved mixing of the gaseous components. The gas mixture is deflected at the bottom of the chimney passageway by the bottom wall 26 of the furnace through the horizontal passageway 50, as indicated by the arrows in Figs. 3, 4 and 5. The gas stream flows from the horizontal passageway 50 into the reaction chamber 54 and is then deflected upwardly by the back wall of reaction chamber 54. The gas stream continues in this circuitous flow through the highly heated restricted passageways 55 in checker work bridge wall 53, and thence into the passages 56 which surround the chimney 44. The reaction gases in the area 56 preheat the exterior walls of the chimney 44, and thereby indirectly heat air and gas mixtures moving downwardly in the interior of the passageway. The reaction gases leave the spaces 56 and converge and intermingle in their discharge flow through the port 57.

In the reaction zones 3 the reaction conditions are adjusted so as to establish a temperature in the effluent reaction gases leaving discharge port 57 of not substantially less than 1600° F. and preferably between about 1800° F. and 2400° F. with the practical optimum range of from 1800° F. to 2000° F. when the process is operating on waste acid gas with a hydrogen sulfide content of approximately 50%. As will be appreciated, this exit temperature will be somewhat influenced by the degree of insulation of the furnace and the analysis of the waste acid gas.

It is now seen that a reaction furnace constructed in accordance with this invention is designed so that concurrent streams of entering gases are brought into contact and homogeneously mixed in an enclosed passageway and are heated by indirect heat exchange by the high temperature products of reaction. This passageway 44 is designed to induce a circuitous of the products passing therethrough and is formed with an opening discharging into the interior of the furnace. In the interior of the furnace the gases are constrained to follow a circuitous path whereby they pass over and contact the exterior of the passageway prior to discharge from the furnace. As will be appreciated, such a circuitous flow of gases through the furnace not only insures effective preheating of the incoming stream, while out of contact with reaction products, but also positively insures homogeneous mixing of the components and uniform distribution of heat throughout the gas mixture.

It also can be seen that the novel reaction furnace herein disclosed comprises a combination of parts which are intimately correlated to insure novel results. Exceptionally high end product yields are attained by utilizing this novel recuperative furnace whereby intimate mixing, rapid preheating and high conversion of the input gases at optimum high temperatures are attained. The sensible heat in the exit gases may be currently utilized in the cycle to preheat the incoming admixture of reactive gases to that range of temperature which insures optimum conversion in the reduction stage.

As shown in Figs. 1 and 2 the reaction gases pass from the outlet port 57 of the furnace 2 through conduit 65 and thence to the waste heat boiler 66. The waste heat boiler may be of any desired and efficient type of material not effected by the gases, and of suitable capacity to reduce the temperature of the reaction gases down to the order of, from approximately 450° F. to about 800° F. with an approximate optimum of about 600° F. As shown in Fig. 1 the boiler 66 is provided with one or more partitions 67 therein, providing a circuitous passageway for the reaction gases which are discharged from the bottom of the boiler into the outlet conduit 68. The boiler is provided with water tubes 69 and steam drum 70. Feed water from supply line 71 is fed to the economizer 72 and passes through a serpentine tube therein and is discharged therefrom at a raised temperature into line 73 and into steam drum 70. An automatic feedwater regulating valve 74 is provided in water inlet line 71 which is controlled by the water level in steam drum 70. Steam is discharged from the drum 70 through high pressure steam line 75. Flow of steam is recorded through steam meter 76. A supply of steam may be tapped off through the tap line 77 to furnish any steam required for subsequent process operations. Tap line 77 may have therein a suitable steam flow control valve 78.

The reaction gases passing through the boiler 66 are discharged through the conduit 68 to a preheater or heat exchanger 80, and through the conduit 81, to the converter 82. In the preheater 80 the reaction gases pass in indirect heat exchange relationship to gases withdrawn from the upper section of condensing tower 83. Such gases pass through conduit 84 and preheater 80 and are discharged through conduit 85 to the second catalytic converter 86.

In passage through the preheater 80 the reaction gases entering from the line 68 at a temperature from 450° F. to 800° F. are reduced in temperature to between 350° F. and 750° F. with an optimum temperature of approximately 500° F. and at which temperature the gas is contacted with a bed c of catalytically active material in the converter 82 to insure further conversion of the sulfur bearing gases to vaporous sulfur.

In the event that air in excess of a stoichiometric amount is admitted to the furnace 2, the reaction gases entering the converter 82 through line 81 may be mixed with predetermined amounts of waste acid gas diverted from line 1 through line 10 to duct 81, as shown in Fig. 1, so that a stoichiometrical balance of the air and waste acid gas is restored at the entrance of the converter 82. In this manner a proportion of waste acid gas may be treated in the converter 82 without passing through the high temperature reaction zones in furnace 2.

The structural details of the converter are illustrated more particularly in Figs. 6 and 7 of the drawings. In general outline, the converter 82 comprises a body wall 150 which may be constructed of heavy steel plates and closed at the bottom thereof by a bottom wall 151 constructed of heavy steel plate, and a top cover wall 152 constructed of heavy steel plate which may generally have a rotund shape. The reaction gases are admitted to the converter through a port 153 defined by a tubular fitting 154 formed of steel plate secured to the top wall 152 of the converter 82. The fitting 154 is provided with a suitable flange 155 by means of which the end of the reaction gas duct 81 may be connected. The top wall 152 of the converter may be provided with one or more clean out ports 156 each defined by a tubular collar 157 formed of steel plate welded or riveted to the cover wall 152. Each of the ports 157 may be normally closed by a removable cover plate 158. Each cover plate 158 may be provided with ports 158' for introduction of suitable preheating burners. A baffle plate 160 may be suspended within the converter from the top wall 152 by suitable suspension rods 161. The baffle plate 160 is positioned immediately below the port 153 and operates to effect uniform distribution of the reaction gases to be treated throughout the cross-sectional area of the converter.

The body wall 150 and the bottom wall 151 of the converter are preferably lined with firebrick 162 to protect the steel plates from corrosion, and to prevent loss of heat generated by the reactions set up in the converter. The screen 87 which supports the catalyst bed c rests upon a grid 163 of corrosion resistant metal, presenting a relatively open supporting network which offers little or no resistance to the flow of reaction gases thereto. The grid bars 163 are supported by spaced posts 165 preferably formed of heat resistant material, whose lower ends rest upon firebrick lining 162 which covers the interior surface of the converter bottom wall 151. The grid work 163 extends substantially parallel to the bottom wall of the converter 82 but is spaced some distance thereabove. The heated gases passing downwardly through the bed of catalyst c are thus free to flow into the space below the grid work 163 and out through discharge ports 167 at the sides of the converter. The discharge ports 167 may be formed by tubular fitting 168 formed of steel plate welded or riveted to the body wall 150 of the converter.

Referring more particularly to Figs. 1 and 2, the reaction gases flow through conduit 81 to converter 82. Referring to Fig. 7, the reaction gases flow into the converter through port 153 at the top of the converter. The reaction gases are dispersed by the baffle plate 160 and are substantially uniformly distributed throughout the cross-sectional area of the converter, so that the reaction gases move downwardly therein in a uniformly distributed manner through the catalyst bed c. The catalyst bed c may comprise such materials as alumina, bauxite, iron oxide, silica gel, or other suitable material which facilitates the formation of elemental sulfur and is sufficiently refractory to withstand the operating temperatures. The catalyst is preferably employed in the form of a granular mass supported on the heat and corrosion resistant foraminous screen 87 which may be formed of stainless steel. The depth of the catalyst bed may vary considerably depending upon such factors as the activity of the catalysts employed, the particle size of the granules, and the like. The quantity employed, as will be understood is chosen to insure maximum conversion without building up of too great a resistance to gas flow.

The area of the catalyst bed c similarly may be varied and is essentially determined by the quantity of sulfur to be produced in the unit.

It has been found desirable in practice to cover the catalyst bed with a thin layer of crushed firebrick d and to support the bed on a similar thin layer of crushed firebrick e spread on the retaining screen 87. This serves to prevent disturbance of the catalyst by the rapidly flowing gas stream.

The treated gases are discharged from the converter through the discharge ports 167 to side ducts 88 and pass through a common duct 89 to the economizer 72. The reaction taking place in the converter is exothermic. In the typical operation the temperature of the gas discharged is about 100° F. higher than the inlet temperature the inlet temperature ranging from 350° F. to 750° F. with an optimum of approximately 500° F. and at the outlet 167 the temperature of the treated gases ranges from 450° F. to 850° F. with an optimum of approximately 600° F.

The gases passing downwardly through the economizer 72 to preheat the boiler feed water up to a temperature of the order of from 300° F. to 425° F. in the manner described, and as a result of this abstraction of the heat, the gases are cooled to from approximately 270° F. to 450° F. with an optimum of 300° F. The gases pass from the bottom of the economizer 72 through conduit 90 through entrance duct 220 to the lower portion of scrubbing unit 83. This scrubbing unit or condenser is claimed in our copending application Serial No. 83,906, filed March 28, 1949.

The structural details of the scrubbing unit 83 may be more clearly understood by referring to Figs. 8 and 9 of the drawings. The scrubbing unit comprises more particularly a tower 170 which is capped by a housing 171. The tower 170 is preferably built up from a series of baffle sections 172 arranged in superimposed relationship and capped by a distributing section 182 at the top thereof. Each of the baffle sections 172 comprise a tubular enclosing wall built up from steel plate which may be either round or polygonal in cross-section. The baffle sections 172 and the distributing section 182, as shown in Figs. 8 and 9, have enclosing walls which are approximately rectangular in cross-section. The upper and lower ends of each section 172 may be provided with outwardly flared flanges 173 by means of which the sections can be suitably connected together.

Each baffle section 172 contains a series of spaced horizontal extending frame bars 178, 179, 180, and 181, extending along opposite sides thereof to which a series of inclined ladder bars 174, 175, and 176, are attached. It will be noted by referring more particularly to Fig. 9 that the ladder bars 174 and 176 are inclined in one direction while the intermediate bars 175 are inclined in the opposite direction. A series of horizontally spaced extending baffles such as bars 98, extend between and are secured to the series of ladder bars 174, 175, and 176. The baffles 98 may have an angular cross-section and are preferably formed of corrosion resistant metal such as stainless steel. It will be noted that the baffles 98 are arranged in staggered relationship so that droplets or small streams of liquid falling on the upper bars will successively fall against successive baffles 98 as the liquid stream or droplets move downwardly through the successive baffle sections 172 of the tower 170.

The distributing section 182 has the same cross-sectional contour as the baffle sections 172, and is provided with outwardly flared flanges 183 at each end thereof. The lower flange 183 is bolted or secured to the upper flange 173 of the topmost baffle section 172.

The liquid line 96 is connected to a horizontally extending distribution pipe 187 which enters into the top part of the distribution section 182. To the distribution pipe 187 is connected a series of branched pipes 188 each having a downwardly projecting row of nozzles 190 which direct the cooling liquid downwardly at various spaced points within the upper end of the distribution section 182. The inner end of the distribution pipe 187 may be supported by a bar 189 fixed at the ends thereof to the opposite side walls of the distribution section 182.

A series of relatively closely spaced inclined metal baffle plates 186 extend transversely across the interior of the distribution section. Immediately below the series of metal baffle plates 186 is another series of metal baffle plates 186' inclined in the opposite direction. The upper and lower series of baffle plates 186 and 186' are fixed to supporting bars 184 whose ends are secured to the opposite side walls of the distribution section 182. Directly below each row of nozzles 190 is a shallow receiving trough 191 into which the condensing liquid from the nozzles 190 may drop. Each trough 191 has a plurality of discharge nozzles 192 in the bottom thereof through which the condensing liquid may pour out. It will be noted by referring to Fig. 9 that the upper and lower series of baffle plates 186 and 186' are cut away as indicated at 193A directly below each row of nozzles 190, so as to permit the coolant liquid to flow from nozzles 190 directly into the receiving troughs 191 without interference from the baffle plates 186 and 186'. It will be appreciated that the baffle plates 186 and 186' serve to provide surfaces upon which the sulfur vapors may condense and upon which sulfur spray will form into droplets which will drip downwardly from trough 191 through nozzles 192 in the tower.

Directly below each row of nozzles 192 is a splash board 193 supported upon angle bars 194 whose ends are secured to the opposite side walls of the distribution section 182. The coolant liquid discharged from nozzles 192 will splash against the splash boards 193 and thence further splash against the series of baffles 98 in the successive baffle sections 172. Thus the coolant liquid discharged from the nozzles 192 will be broken into small rain-like droplets which are agitated and distributed uniformly within the tower as they move downwardly toward the bottom thereof.

The scrubbing unit 83 is provided with a tank 91 at the base thereof in which the coolant liquid, preferably molten sulfur, is collected and contained. The tank 91 is built up of steel plate and is provided with a bottom wall 200 and enclosing side walls 201, above which the tower 170 is mounted. The enclosing side wall 201 may be reinforced by suitable frame members 203 and is divided internally by a partition wall 204 into a cooling section 205 and a pump sump section 206. The tank 91 may be provided with a clean-out door 218 provided at the lower end of the enclosing side wall 201 thereof. The coolant liquid or molten sulfur flows from the cooling section 205 under the division wall 204 into the pump sump section 206. The cooling section 205 contains cooling coils 92 joined at the ends thereof to an entrance header 207 and a discharge header 208. Cooling water enters the entrance header 207 by a water line 93 and is discharged through outlet pipe 209 connected to the discharge header 208. A steam line 94 may also be connected to the inlet header 207 to heat the coils 92, the steam being removed through an outlet line 219 connected to the discharge header 208.

The cooled liquid, such as molten sulfur, flowing into the pump sump section 206 is pumped by a pump 95 upwardly through the vertical line 96 which is connected at the upper end thereof to the distribution pipe 187. The pump 95 driven by a motor 95' extends into the liquid contained in the pump sump section 206.

The scrubber unit designated by numeral 83 in the sulfur recovery system shown in Figs. 1 and 2 is constructed as shown in Figs. 8 and 9 and above described. The reaction gases containing the sulfur vapors to be scrubbed out enter the lower end of the scrubbing unit 83 through a suitable fitting 220 connected to the supply conduit 90 at a temperature approximately 270° to 450° F. The reaction gases with the entrained sulfur vapors rise upwardly through the tower 170 in counterflow to the downwardly splashing droplets of liquid sulfur distributed throughout the tower in small droplets by the splash plates 193 and baffles 98. Sulfur vapors entrained in the reaction gases are thus washed out or condensed by the downwardly cascading stream of liquid sulfur, which has a temperature of 260° to 270° F.

The inclined baffle plates 186 and 186' provide spray removal surfaces on which any remaining vapors not removed from the reaction gases may be caught. The scrubbed reaction gases, free of sulfur vapor, pass out through the discharge port 221 at the upper end of the housing 171 of the scrubber unit. The housing 171 of the scrubber unit may be provided with access ports 222 which provide access to the interior of the tower.

The stream of molten sulfur pumped into the upper end of the distribution section by the pump 95 through the supply line 96 cascades downward and is joined by additional molten sulfur produced by the condensation of the sulfur vapors entrained in the reaction gases passing upwardly through the tower 170. This molten sulfur collects in the cooling section 205 where it is cooled down to a temperature of approximately 260° F. to 270° F. by the cooling coils 92. Water flowing through the cooling coils 92 serve to maintain the liquid sulfur at the desired predetermined temperature. In a typical operation the water may enter the cooling coils 92 at a temperature of approximately 80° F. and leave the coils through the water discharge line 209 at a temperature of approximately 120° F. Should it be desirable to heat the sulfur contained in the pump sump section 206 and the cooling section 205 as during periods of shutdown, steam may be passed through the cooling coils 92 received from tap line 77 and admitted through the steam line 94 and discharged through the steam line 210. The pump 95 operates continuously during operations and transfers the molten sulfur from the pump sump section 206 to the distribution system within the section 182. The molten sulfur accumulating in the pump sump section 206 may be drained off continuously or intermittently through the weir line 99 to the receiving vessel 100, which if desired may be suitably heated to permit ready removal of the elemental sulfur in liquid form.

In order to secure maximum liquefaction of the sulfur vapors entering the tower 170 it is desirable that the reaction gases discharged from the tower 170 through outlet 221 be held at approximately 260° F., that is to say, the gas escaping from the tower should be as close to the freezing point of sulfur as possible, and preferably only sufficiently above the freezing point to prevent the solidification of sulfur in the upper part of the tower and ducts leading from the tower.

In the tower 170 due to the direct contact of the cooled molten sulfur with the entering gas, the temperature of such gas is rapidly reduced. For example, in typical operation the gas is discharged from the economizer 72 to the scrubber unit 83 at a temperature of about 290° F. to about 400° F. In passing upwardly through the tower the gases are substantially cooled and are discharged at a temperature of about 260° F.

It is found that when operating the process in the manner described, the gases discharged from the top of the scrubber unit 83 are substantially denuded of free sulfur and contain but a small amount of combined sulfur. Numerous tests indicate that the combined sulfur in such gases is only approximately 2% to 5%. If desired, this gas may be discharged from the system. Additional quantities of sulfur, however, can be recovered economically from such overhead reaction gas in the manner shown in Figs. 1 and 2.

As previously explained, the overhead reaction gases from the scrubber unit 83 flow into the heat exchanger 80 at a temperature of approximately 260° F. and there pass in indirect heat exchange relationship with higher temperature reaction gases supplied by line 68. As a result of such heat exchange the temperature of the overhead reaction gases from the scrubber unit 83 is raised to approximately 450° F. to 700° F. with an optimum temperature of about 500° F. This gas is passed to the second catalytic converter 86 which is illustrated in Fig. 1 and is the same in essential details as converter 82 illustrated in detail in Figs. 6 and 7, and previously described. Since the reaction gases entering the converter 86 contain relatively small amounts of sulfur compounds the converter 86 may be appreciably smaller than converter 82. The catalyst bed c in converter 86 should be of sufficient area to take care of unexpected loads and to avoid any appreciable back pressure.

In normal operation the gas passing to the converter 86 contains about 2% to 5% of sulfur containing gases. In passage through converter 86 a substantial proportion of these sulfur compounds are converted to elemental sulfur in vapor form. In typical operations the content of sulfur containing gases in the gas discharged from this second converter is approximately 1% by volume.

The gases discharged from converter 86 at a temperature of from about 420° F. to 720° F. are passed through conduit 101 to the lower section of a second scrubber unit 102 which is similar in structure and function to scrubber unit 83. A water tubed gas cooler 103 preferably is connected to gas conduit 101 so as to cool the gases therein to approximately 300° F. The scrubber unit 102 as shown in Fig. 1, is provided with a tank 106 at the bottom thereof for the accumulation of liquid sulfur, the temperature of which is controlled by the coil 107. Water may be passed through the coil 107 from the line 108 to abstract heat from the molten sulfur in the manner previously described. The coil 107 may also be connected with steam line 109 supplied with steam by tap line 77 so that an elevated temperature may be established at any time, as for example, during shut-down periods and the like. Liquid sulfur is pumped to the top of the tower by pump 110 operated by motor 110' through line 111. The downwardly flowing sulfur spatters over the baffle plates 98 in the scrubber unit 102 and is recurrently dispersed into fine droplets which intimately contact the upwardly flowing gases and cools these gases to the liquefaction point of sulfur, which liquefied sulfur accumulates in the tank 106. The accumulated sulfur in tank 106 is continuously or intermittently withdrawn through weir line 112 and is discharged into insulated line 99' and into the storage vessel 100. The temperature recorders 113 record the temperature of the liquid sulfur circulated through lines 96 and 111.

The gases and vapors uncondensed in the scrubber unit 102 pass out through the stack 114. This effluent gas contains substantially all the carbon dioxide in the waste acid gas feed, the nitrogen from the air, and the water vapor in the feed and produced during the reaction, together with the indicated minor amounts of hydrogen sulfide and sulfur dioxide which is so small that the effluent gas is substantially free of obnoxious odor and accordingly may be discharged into the atmosphere.

A plant of the type described operates efficiently on waste acid gas from a high hydrogen sulfide content of the order of 60% or more down to about 15% and containing in addition carbon dioxide, carbon monoxide, water vapor and sundry hydrocarbons. In most instances it has been found that for the economical commercial recovery of sulfur the waste acid gas charged should not be below about 15% to 20% of hydrogen sulfide. Obviously, however, where the criteria of public health and the nuisance character of the source material becomes important in a particular case, the novel operation may be desirable on gases containing relatively low concentrations of hydrogen sulfide, the cost being considerably reduced by the credit received from the recovered sulfur and steam.

As noted hereinbefore, the apparatus permits a wide permissive flexibility in operation. In lieu of the described operation, i. e., in which all of the acid gas and air are passed through the furnace, operations may be conducted in which a split feed of acid gas is utilized. In this operation, as previously described, all of the air required for the operation is passed through the furnace admixed with from ⅓ to ½ or more of the gas and the remaining gas is fed to the converter 82 through line 10 in a manner to obtain a stoichiometric balance in the converter 82. The exothermic heat developed in the converter is sufficient to maintain continuous conversion of the split gas feed.

As will have been noted, the striking efficiency of the operation is due in a considerable degree to the design of, and effective control of operating conditions in the furnace. It will be further noted that the apparatus depicted in Fig. 1 represents what might be called the optimum apparatus in that it is designed to recover the maximum amount of sulfur from the gaseous source material. There are a number of apparatus designs of more simplified form and which require somewhat less apparatus which may be conducted, a typical example of which is shown in Fig. 10. Whereas, the apparatus disclosed in Fig. 1 effects what may be called three progressive conversion stages, i. e., conversion in the furnace and sequential conversions in converter 82 and converter 86, the apparatus shown in Fig. 10 utilizes two conversion stages, namely, the high temperature furnace conversion and one lower temperature catalytic conversion stage with appropriate intermediate cooling and temperature control. The principles of operation of the apparatus shown in Fig. 10 are the same as those embodied in Fig. 1, the only essential difference being that in such operation the ultimate percentage recovery of sulfur is less than the potential recovery which is achieved in the unit of Fig. 1.

As shown in Fig. 10 the essential parts of the apparatus include the furnace 2, the waste heat boiler 66, the heat exchanger 80, the economizer 72, the first scrubbing unit 83, catalytic converter 86, the water cooler 103, and the second scrubbing unit 102. The structure and function of these elements are as previously described for Fig. 1.

In operation waste acid gas and stoichiometrically proporioned amounts of air are concurrently fed to the furnace through the lines 1 and 16 respectively. In the furnace, which is similar in structure as that shown in Figs. 3, 4, and 5, the gases are homogeneously mixed, highly heated and are reacted to produce a proportion of elemental sulfur in vapor form. The reaction gases pass from the furnace, at a temperature of from approximately 1600° F. to 2400° F., through the conduit 65 to the waste heat boiler 66. The boiler is provided with steam drum 70 to which feed water is admitted from line 73 and from which generated steam is withdrawn through line 75. The feed water, if desired, may be preheated in the economizer 72 supplied with water through line 71 and discharged into branch line 73' which feeds into the feed water line 73. Additional hot water is generated by the cooler 103 supplied with water through line 104 and discharging into hot water line 105 which may also supply the feed water line 73.

The reaction gases are discharged from the boiler 66 into the conduit 68 at a temperature ranging from 450° F. to 800° F. and are conducted into the heat exchanger 80 where they are cooled down and discharged at a temperature of 400° F. to 500° F. through conduit 120 leading into the upper end of the economizer 72.

In the heat exchanger 80 the gases from the boiler preheat the gases which are discharged from the top of the tower 83 and through the line 84. These tower gases enter the top of the heat exchanger 80 at about 265° F. and are discharged from the preheater or heat exchanger 80 through line 85 to the catalytic converter 86 at a temperature of from 350° F. to 550° F.

The reaction gases entering the economizer are cooled by the water entering the lower end of the economizer and discharge into conduit 90 at a temperature in the nature of 300° F. at which temperature the gases enter the lower end of scrubber unit 83.

As has been previously described the scrubber unit 83 is provided with a tank 91 located in the base for the accumulation of liquefied sulfur. The pool of sulfur may be maintained at the described desirable temperature of between 260° F. and about 280° F. by means of a coil 92 through which a cooling medium is admitted from line 93 and discharged through line 92'.

As shown in Figs. 8, 9, and 10 sulfur vapor-containing gases flowing upwardly through the scrubber unit 83 are contacted by streamlets of molten sulfur cascading downward from the distributor 190. Molten sulfur is forced to distributor 190 through line 96 by pump 95 driven by motor 95'. As a result of such contact, as has been explained, the gases are cooled and the sulfur vapors are condensed and collected in tank 91. The molten sulfur is withdrawn through weir line 99 and drain line 99' into accumulator tank 100. The temperature of the sulfur in tank 100 may be maintained at the desired temperature by a heating coil.

The scrubbed reaction gases passing out of scrubber unit 83, stripped of free sulfur, are preheated in the heat exchanger 80 in the manner described and passed to the converter 86 wherein further conversion of sulfur bearing gases to free sulfur in vapor phase occurs. The converter 86 is of the same construction as above described, and is provided with a bed of catalytic material c of the class previously mentioned.

The effluent gases from converter 96 flow through line 101, are cooled by cooler 103 and are then scrubbed with liquid sulfur in scrubber unit 102 which sulfur is pumped from the tank 106 by pump 110 driven by motor 110' through line 111 to the top of the second scrubber unit 102. The desired temperature of from 270° F. to about 280° F. is maintained in the sulfur pool in tank 106 by means of the cooling coil 107. As heretofore described, this coil may be connected to the steam line 109 and to the water line 108 for heating or cooling as desired.

The liquid sulfur descends in the scrubber unit 102 in the form of droplets sequentially from plate to plate 98 and functions to condense the sulfur vapor contained in the gas and accumulate it in the tank 106 at the base of the scrubber unit 102. Such liquid sulfur may be drawn from the base of the tower through weir line 112 to the accumulator tank 100.

It will be noted that all parts of the apparatus are so designed that any liquid sulfur which may form at any point in the system will drain through the system or through appropriately located drain lines leading to the molten sulfur tanks 91 and 106 so that the formation of molten sulfur does not impede or interfere with the operation.

It will now be seen that the apparatus comprises a combination of parts and devices which are intimately correlated to insure novel results. Exceptionally high yields of elemental sulfur from hydrogen sulfide are attained by utilizing the novel recuperative furnace where intimate mixing, rapid preheating, and high reaction are attained at the optimum high temperatures. The sensible heat of the exit gases is not only ultimately recovered, as for example in the form of available steam, but also such heat is utilized currently in the cycle to adjust the temperature of the gases discharged from the scrubber unit 83 to that range which insures optimum conversion in the catalytic reduction stage 86.

It will be appreciated that technical utilization may be made of the effluent gases. As noted, these gases have a high content of carbon dioxide. Whenever desired, such gases may be further treated to purify them and to recover the carbon dioxide in substantially a pure state as a gas, liquid, or solid.

While preferred embodiments of the invention have been described, it is understood that these are given didactically to illustrate the fundamental principles involved, and not as limiting the useful scope of the invention to the particular embodiments illustrated.

What is claimed is:

1. Apparatus for producing elemental sulfur from sulfide-containing gases which comprises a reaction furnace having an enclosed refractory lined chamber with an outlet opening in one wall thereof, an inlet conduit of refractory material having an entry on the exterior of said furnace and extending into said chamber in two reaches, the outlet reach of said conduit being at substantially right angles to the inlet reach and substantially perpendicular to the wall in which the outlet opening of the furnace is located so that the outlet opening of the conduit in said chamber is directed in the opposite direction from the outlet opening of said chamber, baffling elements in said furnace between the conduit entry and the chamber outlet opening, a sulfur scrubbing unit, and a temperature regulator unit interconnecting said reaction furnace outlet opening and said sulfur scrubbing unit.

2. Apparatus for producing elemental sulfur from sulfide-containing gases which comprises a reaction furnace having an enclosed refractory lined chamber with an outlet opening in one wall thereof, an inlet conduit of refractory material having an entry on the exterior of said furnace and extending into said chamber in two reaches, the outlet reach of said conduit being at substantially right angles to the inlet reach and substantially perpendicular to the wall in which the outlet opening of the furnace is located so that the outlet opening of the conduit in said chamber is directed in the opposite direction from the outlet opening of said chamber, baffling elements in said furnace between the conduit entry and the chamber outlet opening, a catalyst chamber connected to said chamber outlet opening through a temperature regulator unit, and a scrubbing unit connected to said catalyst chamber.

3. Apparatus for producing elemental sulfur from sulfide-containing gases which comprises a reaction furnace having an enclosed refractory lined chamber with an outlet opening in one wall thereof, an inlet conduit of refractory material having an entry on the exterior of said furnace and extending into said chamber in two reaches, the outlet reach of said conduit being at substantially right angles to the inlet reach and substantially perpendicular to the wall in which the outlet opening of the furnace is located so that the outlet opening of the conduit in said chamber is directed in the opposite direction from the outlet opening of said chamber, baffling elements in said furnace between the conduit entry and the chamber outlet opening, a sulfur scrubbing unit connected to said chamber outlet opening, a catalyst chamber interconnected with said scrubbing unit, a heat exchange unit interconnected between the input and output of said sulfur scrubbing unit adapted to reduce the temperature of input gases to said scrubbing unit and increase the temperature of the output gases therefrom, and a second scrubbing unit connected to the output of said catalyst chamber.

4. Apparatus for producing elemental sulfur from sulfide-containing gases which comprises a reaction furnace having an enclosed refractory lined chamber with an outlet opening in one wall thereof, an inlet conduit of refractory material having an entry on the exterior of said furnace and extending into said chamber in two reaches, the outlet reach of said conduit being at substantially right angles to the inlet reach and substantially perpendicular to the wall in which the outlet opening of the furnace is located so that the outlet opening of the conduit in said chamber is directed in the opposite direction from the outlet opening of said chamber, baffling elements in said furnace between the conduit entry and the chamber outlet opening, a catalyst chamber connected to said chamber outlet opening through a temperature regulator unit, a scrubbing unit connected to the output of said catalyst chamber, said temperature regulator being adapted to cool the input gases to said catalyst chamber, the output of said unit being connected to said temperature regulator so that the input gases to said catalyst chamber are cooled by the exit gases of said scrubbing unit, a second catalyst chamber connected to the output of said scrubbing unit through said regulator unit, and a second scrubbing unit connected to the output of said second catalyst chamber.

5. Apparatus for producing elemental sulfur from sulfide-containing gases which comprises a reaction furnace having an enclosed refractory lined chamber with an outlet opening in one wall thereof, an inlet conduit of refractory material having an entry on the exterior of said furnace and extending into said chamber in two reaches, the outlet reach of said conduit being at substantially right angles to the inlet reach and substantially perpendicular to the wall in which the outlet opening of the furnace is located so that the outlet opening of the conduit in said chamber is directed in the opposite direction from the outlet opening of said chamber, baffling elements in said furnace between the conduit entry and the chamber outlet opening, a scrubbing unit connected to said chamber outlet opening, a catalyst chamber having two inlets, the first catalyst chamber inlet being connected to the outlet of said scrubbing unit through a temperature regulator and the second catalyst chamber inlet being connected to a source of sulfide-containing gases, and a second scrubbing unit connected to said catalyst chamber.

6. Apparatus for producing elemental sulfur from sulfide-containing gases which comprises a reaction furnace having an enclosed refractory lined chamber with an outlet opening in one wall thereof, an inlet conduit of refractory material having an entry on the exterior of said furnace and extending into said chamber in two reaches, the outlet reach of said conduit being at substantialy right angles to the inlet reach and substantially perpendicular to the wall in which the outlet opening of the furnace is located so that the outlet opening of the conduit in said chamber is directed in the opposite direction from the outlet opening of said chamber, baffling elements in the furnace between the conduit entry and the chamber outlet opening a catalyst chamber having two inlets, the first catalyst chamber inlet being connected to the furnace outlet opening through a temperature regulator and the second catalyst chamber inlet being connected to a source of sulfide-containing gases, and a scrubbing unit connected to the output of said catalyst chamber.

7. Apparatus for producing elemental sulfur from sulfide-containing gases which comprises a reaction furnace having an enclosed refractory lined chamber with an outlet opening in one wall thereof, an inlet conduit of refractory material having an entry on the exterior of said furnace and extending into said chamber in two reaches, the outlet reach of said conduit being at substantially right angles to the inlet reach and substantially perpendicular to the wall in which the outlet opening of the furnace is located so that the outlet opening of said conduit in said chamber is directed in the opposite direction from the outlet opening of the chamber, the interior surfaces of said conduit having inwardly extending projections thereon, a checker-brick wall in said chamber of substantial extent extending transverse to said second duct section, a waste heat boiler connected to said chamber outlet opening adapted to reduce the temperature of the reaction gases from said reaction furnace, a first catalyst chamber having two inlets adapted to convert sulfide-containing gases to elemental sulfur, the first catalyst chamber inlet being connected to said waste heat boiler and the second catalyst chamber inlet being connected to a source of sulfide-containing gases, a first scrubbing unit adapted to convert vapor phase sulfur to liquid phase sulfur, a heat exchanger unit interposed between said scrubbing unit and said catalyst chamber adapted to transfer heat between the input gases to said catalyst chamber and the effluent gases from said scrubbing unit, an economizer unit associated with said first scrubbing unit adapted further to cool input gases to said scrubbing unit and to preheat feed water for said boiler, a second catalyst chamber connected to said scrubbing unit and adapted to convert sulfide-containing gases to elemental sulfur, a second scrubbing unit adapted further to convert vapor phase sulfur to liquid phase sulfur, and a temperature regulator unit interconnecting said second catalyst chamber and said second scrubbing unit adapted to reduce the temperature of effluent gases from said second catalyst chamber.

8. Apparatus for producing elemental sulfur from sulfide-containing gases which comprises a reaction furnace comprising an enclosed refractory lined chamber having an outlet opening in one wall thereof, a plurality of parallel walls interior said chamber adapted to divide said chamber into a plurality of communicating compartments, an inlet conduit of refractory material having an entry on the exterior of said furnace and extending into each of said compartments in two reaches, the outlet reach of each of said conduits being at substantially right angles to the inlet reach and substantially perpendicular to the wall in which the outlet opening of the furnace is located so that the outlet opening of the conduit in each compartment is directed in the opposite direction from the outlet opening of said chamber, baffling elements in the furnace between the conduit entry and the chamber outlet opening, a sulfur scrubbing unit, and a temperature regulator unit interconnecting said reaction furnace outlet opening and said sulfur scrubbing unit.

9. Apparatus for producing elemental sulfur from sulfide-containing gases which comprises a reaction furnace comprising an enclosed refractory lined chamber having an outlet opening in one wall thereof, a plurality of parallel walls interior said chamber adapted to divide said chamber into a plurality of communicating compartments, an inlet conduit of refractory material having an entry on the exterior of said furnace and extending into each of said compartments in two reaches, the outlet reach of each of said conduits being at substantially right angles to the inlet reach and substantially perpendicular to the wall in which the outlet opening of the furnace is located so that the outlet opening of the conduit in each compartment is directed in the opposite direction from the outlet opening of said chamber, baffling elements in the furnace between the conduit entry and the chamber outlet opening, a catalyst chamber connected to the furnace outlet opening through a temperature regulator unit, and a scrubbing unit connected to said catalyst.

10. Apparatus for producing elemental sulfur from sulfide-containing gases which comprises a reaction furnace comprising an enclosed refractory lined chamber having an outlet opening in one wall thereof, a plurality of parallel walls interior said chamber adapted to divide said chamber into a plurality of communicating compartments, an inlet conduit of refractory material having an entry on the exterior of said furnace and extending into each of said compartments in two reaches, the outlet reach of each of said conduits being at substantially right angles to the inlet reach and substantially perpendicular to the wall in which the outlet opening of the furnace is located so that the outlet opening of the conduit in each compartment is directed in the opposite direction from the outlet opening of said chamber, baffling elements in the furnace between the conduit entry and the chamber outlet opening, a catalyst chamber having two inlets, the first catalyst chamber inlet being connected to the furnace outlet opening through a temperature regulator and the second catalyst chamber inlet being connected to a source of sulfide-containing gases, and a scrubbing unit connected to the output of said chamber.

11. Apparatus for producing elemental sulfur from sulfide-containing gases which comprises a reaction furnace comprising an enclosed refractory lined chamber with an outlet opening in one wall thereof, a plurality of parallel walls interior said chamber adapted to divide said chamber into a plurality of communicating compartments, an inlet conduit of refractory material having an entry on the exterior of said furnace and extending into each of said compartments in two reaches, the outlet reach of each of said conduits being at substantially right angles in the inlet reach and substantially perpendicular to the wall in which the outlet opening of the furnace is located so that the outlet opening of said conduit in said chamber is directed in the opposite direction from the outlet opening of said chamber, the interior surfaces of said duct having inward projections thereon, a checker-brick wall in said chamber of substantial extent extending transverse to said duct section, a waste heat boiler connected to the furnace outlet opening adapted to reduce the temperature of the reaction gases from said reaction furnace, a first catalyst chamber having two inlets adapted to convert sulfide-containing gases to elemental sulfur, said first inlet being connected to said waste heat boiler and said second inlet being connected to a source of sulfide-containing gases, a first scrubbing unit adapted to convert vapor phase sulfur to liquid phase sulfur, a heat exchange unit interposed between said scrubbing unit and said catalyst chamber adapted to transfer heat between the input gases to said catalyst chamber and the effluent gases from said scrubbing unit, an economizer unit associated with said first scrubbing unit adapted further to cool input gases to said scrubbing unit and to preheat feed water for said boiler, a second catalyst chamber connected to said scrubbing unit and adapted to convert sulfide-containing gases to elemental sulfur, a second scrubbing unit adapted further to convert vapor phase sulfur to liquid phase sulfur, and a temperature regulator unit interconnecting said catalyst chamber and said second scrubbing unit adapted to reduce the temperature of effluent gases from said second catalyst chamber.

12. A reaction furnace comprising an enclosed refractory lined chamber having an outlet opening in one wall thereof, an inlet conduit of refractory material having an entry on the exterior of said furnace and extending into said chamber in two reaches, the outlet reach of said conduit being at substantially right angles to the inlet reach and substantially perpendicular to the wall in which the outlet opening of the furnace is located so that the outlet opening of the conduit in said chamber is directed in the opposite direction from the outlet opening of said chamber, and baffling elements in said furnace between the conduit entry and the chamber outlet opening.

13. A reaction furnace comprising an enclosed refractory lined chamber having an outlet opening in one wall thereof, an inlet conduit of refractory material having an entry on the exterior of said furnace and extending into said chamber in two reaches, the outlet reach of said conduit being at substantially right angles to the inlet reach and substantially perpendicular to the wall in which the outlet opening of the furnace is located so that the outlet opening of said conduit in said chamber is directed in the opposite direction from the outlet opening of said chamber, the interior surfaces of said conduit having inwardly extending projections thereon, and baffling elements in said furnace between the conduit entry and the chamber outlet opening.

14. A reaction furnace comprising an enclosed refractory lined chamber having an outlet opening in one wall thereof, an inlet conduit of refractory material extending into said chamber in two reaches, the outlet reach of said conduit being at substantially right angles to the inlet reach and substantially perpendicular to the wall in which the outlet opening of the furnace is located so that the outlet opening of said conduit in said chamber is directed in the opposite direction from the outlet opening of said chamber, and a checker-brick wall in said chamber of substantial extent extending transverse to said outlet reach.

15. A reaction furnace comprising an enclosed refractory lined chamber having an outlet opening in one wall thereof, a plurality of parallel walls interior said chamber adapted to divide said chamber into a plurality of communicating compartments, an inlet conduit of refractory material having an entry on the exterior of said furnace and extending into each of said compartments in two reaches, the outlet reach of each of said conduits being at substantially right angles to the inlet reach and substantially perpendicular to the wall in which the outlet opening of the furnace is located so that the outlet opening of the conduit in each compartment is directed in the opposite direction from the outlet opening of said chamber, and baffling elements in said furnace between the conduit entries and the chamber outlet opening.

16. A reaction furnace comprising a refractory lined chamber having an outlet opening in one wall thereof, a plurality of parallel walls interior said chamber adapted to divide said chamber into a plurality of communicating compartments, an inlet conduit of refractory material having an entry on the exterior of said furnace and extending into each of said compartments in two reaches, the outlet reach of each of said conduits being at substantially right angles to the inlet reach and substantially perpendicular to the wall in which the outlet opening of the furnace is located so that the outlet opening of the conduit in each compartment is directed away from the outlet opening of said chamber, the interior surfaces of said conduit having inwardly extending projections thereon, and baffling elements in said furnace between the duct inlets and the furnace outlet aperture.

SAMUEL L. NEVINS.
JAMES S. GILLIAM, Jr.

REFERENCES CITED

The following references are of record in the file of this patent:

UNITED STATES PATENTS

| Number | Name | Date |
| --- | --- | --- |
| 1,915,365 | Harrell | June 27, 1933 |
| 1,957,265 | Hansen | May 1, 1934 |
| 1,992,685 | Wescott | Feb. 26, 1935 |
| 2,021,937 | Johnstone | Nov. 26, 1935 |
| 2,092,386 | Baehr et al. | Sept. 7, 1937 |
| 2,133,904 | Reichhold | Oct. 18, 1938 |
| 2,200,529 | Baehr et al. | May 14, 1940 |
| 2,388,259 | Fleming | Nov. 6, 1945 |
| 2,408,290 | Byer | Sept. 24, 1946 |

OTHER REFERENCES

Ser. No. 362,376, Koppers (A. P. C.), published April 27, 1943.

Ser. No. 398,346, Koppers (A. P. C.), published April 27, 1943.